(12) United States Patent
Sutardja

(10) Patent No.: US 9,187,005 B2
(45) Date of Patent: *Nov. 17, 2015

(54) SYSTEM AND METHOD FOR CHARGING BATTERIES OF VEHICLES AND RETURNING CHARGE FROM BATTERIES TO UTILITY COMPANIES

(71) Applicant: Marvell World Trade LTD., St. Michael (BB)

(72) Inventor: Sehat Sutardja, Los Altos Hills, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,399

(22) Filed: Mar. 4, 2014

(65) Prior Publication Data

US 2014/0184156 A1    Jul. 3, 2014

Related U.S. Application Data

(63) Continuation of application No. 11/950,168, filed on Dec. 4, 2007, now Pat. No. 8,664,915.

(60) Provisional application No. 60/891,834, filed on Feb. 27, 2007, provisional application No. 60/868,781, filed on Dec. 6, 2006.

(51) Int. Cl.
*H02J 7/00* (2006.01)
*B60L 11/18* (2006.01)

(52) U.S. Cl.
CPC ........... *B60L 11/1824* (2013.01); *B60L 11/184* (2013.01); *B60L 11/1816* (2013.01); *B60L 11/1861* (2013.01); *Y02T 10/7005* (2013.01); *Y02T 10/7044* (2013.01); *Y02T 10/7055* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ...................................................... Y02T 90/14
USPC ......................................................... 320/109
See application file for complete search history.

(56) References Cited

U.S. PATENT DOCUMENTS 5,462,439 A    10/1995    Keith
5,594,318 A    1/1997    Nor et al.

(Continued)

FOREIGN PATENT DOCUMENTS

EP          1487079  A2    12/2004
WO    WO-2005008808  A2    1/2005
WO    WO-2006132070  A1    12/2006

OTHER PUBLICATIONS

International Search Report and Written Opinion of the International Searching Authority or the Declaration mailed Nov. 10, 2008 for International Application No. PCT/US2007/025027 filed Dec. 6, 2007; 19 Pages.

*Primary Examiner* — Edward Tso
*Assistant Examiner* — Johali Torres Ruiz

(57) ABSTRACT

A monitoring module monitors a charge level of a battery in a vehicle. A network interface module transmits a first set of charging parameters for charging the battery to a utility company and receives a reply and a charge return request from the utility company for returning charge from the battery to the utility company. The first set of charging parameters includes the charge level of the battery and a first time of the day for charging the battery. The reply includes a second time of the day for charging the battery. A control module generates a first signal based on the reply and the first set of charging parameters, and a second signal based on the charge return request and charge return parameters. A charging module charges the battery based on the first signal. A charge retrieval module returns the charge based on the second signal.

22 Claims, 17 Drawing Sheets

(56) References Cited

U.S. PATENT DOCUMENTS

| | | |
|---|---|---|
| 5,903,064 A | 5/1999 | Norberg |
| 6,262,256 B1 | 7/2001 | Elsner et al. |
| 6,262,561 B1 | 7/2001 | Takahashi et al. |
| 6,614,204 B2 * | 9/2003 | Pellegrino et al. ............ 320/109 |
| 7,141,321 B2 * | 11/2006 | McArthur et al. ............ 429/443 |
| 7,443,049 B1 | 10/2008 | Jones et al. |
| 7,582,979 B2 | 9/2009 | Oyobe et al. |
| 8,664,915 B2 * | 3/2014 | Sutardja ........................ 320/109 |
| 2003/0120442 A1 | 6/2003 | Pellegrino et al. |
| 2004/0130292 A1 | 7/2004 | Buchanan et al. |
| 2006/0028178 A1 | 2/2006 | Hobbs |
| 2006/0219448 A1 * | 10/2006 | Grieve et al. ................. 180/65.3 |
| 2006/0250902 A1 | 11/2006 | Bender et al. |

\* cited by examiner

SYSTEM AND METHOD FOR CHARGING BATTERIES OF VEHICLES AND RETURNING CHARGE FROM BATTERIES TO UTILITY COMPANIES

CROSS-REFERENCE TO RELATED APPLICATIONS

This application is a continuation of U.S. application Ser. No. 11/950,168 (now U.S. Pat. No. 8,664,915) filed Dec. 4, 2007 which claims the benefit of U.S. Provisional Application No. 60/891,834, filed Feb. 27, 2007, and U.S. Provisional Application No. 60/868,781, filed on Dec. 6, 2006. The disclosures of the above applications are incorporated herein by reference in their entirety.

FIELD

The present disclosure relates to vehicles, and more particularly to systems and methods for charging batteries in vehicles.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Some vehicles are powered at least partially by electric motors. For example, purely electric vehicles rely solely on electric motors and batteries and do not include another propulsion source. Hybrid vehicles include a first propulsion source such as an engine or fuel cell and a second propulsion source such as an electric motor. Hybrid vehicles may operate using one or the other or both propulsion sources depending upon the configuration. In some vehicles, the engine is used solely to recharge the batteries and does not to produce drive power for the vehicle. In other vehicles, the engine may power the vehicle instead of or in addition to the electric motor. During operation, the vehicles deplete the electric charge that is stored in the batteries. Consequently, the batteries may need to be recharged periodically.

Referring now to FIG. 1, a vehicle 10 may comprise one or more vehicle control systems 12 that control the operation of the vehicle 10. For example, the vehicle control systems 12 may include a powertrain controller, a transmission controller and/or other controllers (not shown). The controllers may communicate with each other and may receive inputs from one or more sensors. The controllers generate outputs that control one or more vehicle components such as engines, electric motors, transmissions and/or other vehicle systems (not shown). An electric motor 13 may be used to propel the vehicle as previously described above. The vehicle control systems 12 and the electric motor 13 may be powered by a battery 14 during operation.

A charging module 16 may recharge the battery 14 by drawing power from a supply outlet 20. Specifically, the vehicle 10 may include a power receptacle (i.e., a plug) 18 to receive power from the supply outlet 20 via a cable and connector 19. The supply outlet 20 may receive power from a utility company 23 via a power distribution line 21. The supply outlet 20 may provide the power to the vehicle 10. A power meter 22 may measure the amount of power received by the vehicle 10 from the supply outlet 20 to recharge the battery 14.

The recharging time of the battery 14 may vary depending on many factors. The factors may include the type of the battery 14, the amount of charge consumed by the vehicle 10 before recharging, the rate at which power is supplied by the supply outlet 20, etc.

SUMMARY

A system comprises a control module, a network interface module, and a charging module. The control module stores a first set of charging parameters for charging a battery in a vehicle. The network interface module transmits the first set of charging parameters to a utility company and receives a reply from the utility company. The control module generates a charge control signal based on the reply and the first set of charging parameters. The charging module charges the battery of the vehicle based on the charge control signal.

In another feature, the reply includes a second set of charging parameters that is different than the first set of charging parameters.

In another feature, the reply includes a second set of charging parameters that is the same as the first set of charging parameters.

In another feature, the first set of charging parameters includes a first time to begin charging, and the reply includes a second time to begin charging that is different than the first time.

In another feature, the network interface module comprises one of a wireline interface, a wireless interface, and a power-line carrier (PLC) interface.

In another feature, the system further comprises a converter that communicates with the charging module and that converts power from alternating current (AC) power to direct current (DC) power.

In another feature, the system further comprises a charge monitoring module that monitors a charge level of the battery and that outputs the charge level to the control module, wherein the first set of charging parameters includes the charge level.

In another feature, the system further comprises a user interface module that communicates with the control module and that allows user entry of the first set of charging parameters.

In another feature, the system further comprises a user interface module that communicates with the control module and that allows user entry of a default set of charging parameters, wherein the first set of charging parameters is based on the default set of charging parameters.

In another feature, the network interface module receives a charge return request from the utility company, and the system further comprises a charge retrieval module that selectively returns charge from the battery to the utility company based on the charge return request.

In another feature, the system further comprises an inverter that inverts the charge.

In another feature, a vehicle comprises the system and further comprises an electric motor that drives the vehicle, wherein the battery provides power to the electric motor when the electric motor drives the vehicle.

In still other features, a method comprises storing a first set of charging parameters for charging a battery in a vehicle, transmitting the first set of charging parameters to a utility company, and receiving a reply from the utility company. The method further comprises generating a charge control signal based on the reply and the first set of charging parameters and charging the battery of the vehicle based on the charge control signal.

In another feature, the reply includes a second set of charging parameters that is different than the first set of charging parameters.

In another feature, the reply includes a second set of charging parameters that is the same as the first set of charging parameters.

In another feature, the first set of charging parameters includes a first time to begin charging, and the reply includes a second time to begin charging that is different than the first time.

In another feature, the method further comprises transmitting the first set of charging parameters and receiving the reply via one of a wireline interface, a wireless interface, and a powerline carrier (PLC) interface.

In another feature, the method further comprises converting power from alternating current (AC) power to direct current (DC) power.

In another feature, the method further comprises monitoring a charge level of the battery and including the charge level in the first set of charging parameters.

In another feature, the method further comprises receiving the first set of charging parameters from a user of the vehicle.

In another feature, the method further comprises receiving a default set of charging parameters from a user of the vehicle, wherein the first set of charging parameters is based on the default set of charging parameters.

In another feature, the method further comprises receiving a charge return request from the utility company and selectively returning charge from the battery to the utility company based on the charge return request.

In another feature, the method further comprises receiving the charge return request via one of a wireline interface, a wireless interface, and a powerline carrier (PLC) interface.

In another feature, the method further comprises inverting the charge.

In another feature, the method further comprises providing power from the battery to an electric motor and driving the vehicle using the electric motor.

In still other features, a system comprises control means for storing a first set of charging parameters for charging a battery in a vehicle and network interface means for transmitting the first set of charging parameters to a utility company and receiving a reply from the utility company. The control means generates a charge control signal based on the reply and the first set of charging parameters. The system further comprises charging means for charging the battery of the vehicle based on the charge control signal.

In another feature, the reply includes a second set of charging parameters that is different than the first set of charging parameters.

In another feature, the reply includes a second set of charging parameters that is the same as the first set of charging parameters.

In another feature, the first set of charging parameters includes a first time to begin charging, and wherein the reply includes a second time to begin charging that is different than the first time.

In another feature, the network interface means comprises one of wireline, wireless, and powerline carrier (PLC) interface means for transmitting and receiving data.

In another feature, the system further comprises converter means for converting power from alternating current (AC) power to direct current (DC) power.

In another feature, the system further comprises charge monitoring means for monitoring a charge level of the battery and communicating the charge level to the control means, wherein the first set of charging parameters includes the charge level.

In another feature, the system further comprises user interface means for inputting the first set of charging parameters, wherein the user interface means communicates with the control means.

In another feature, the system further comprises user interface means for inputting a default set of charging parameters, wherein the first set of charging parameters is based on the default set of charging parameters, and wherein the user interface means communicates with the control means.

In another feature, the network interface means receives a charge return request from the utility company, and the system further comprises charge retrieval means for selectively returning charge from the battery to the utility company based on the charge return request.

In another feature, the system further comprises inverter means for inverting the charge.

In another feature, a vehicle comprises the system and further comprises an electric motor that drives the vehicle, wherein the battery provides power to the electric motor when the electric motor drives the vehicle.

In still other features, a computer program executed by a processor comprises storing a first set of charging parameters for charging a battery in a vehicle, transmitting the first set of charging parameters to a utility company, and receiving a reply from the utility company. The computer program further comprises generating a charge control signal based on the reply and the first set of charging parameters and charging the battery of the vehicle based on the charge control signal.

In another feature, the reply includes a second set of charging parameters that is different than the first set of charging parameters.

In another feature, the reply includes a second set of charging parameters that is the same as the first set of charging parameters.

In another feature, the first set of charging parameters includes a first time to begin charging, and the reply includes a second time to begin charging that is different than the first time.

In another feature, the computer program further comprises transmitting the first set of charging parameters and receiving the reply via one of a wireline interface, a wireless interface, and a powerline carrier (PLC) interface.

In another feature, the computer program further comprises converting power from alternating current (AC) power to direct current (DC) power.

In another feature, the computer program further comprises monitoring a charge level of the battery and including the charge level in the first set of charging parameters.

In another feature, the computer program further comprises receiving the first set of charging parameters from a user of the vehicle.

In another feature, the computer program further comprises receiving a default set of charging parameters from a user of the vehicle, wherein the first set of charging parameters is based on the default set of charging parameters.

In another feature, the computer program further comprises receiving a charge return request from the utility company and selectively returning charge from the battery to the utility company based on the charge return request.

In another feature, the computer program further comprises receiving the charge return request via one of a wireline interface, a wireless interface, and a powerline carrier (PLC) interface.

In another feature, the computer program further comprises inverting the charge.

In another feature, the computer program further comprises providing power from the battery to an electric motor and driving the vehicle using the electric motor.

In still other features, a system comprises a network interface module, a control module, and a charge retrieval module. The network interface module receives a charge return request from a utility company for returning charge from a battery in a vehicle to the utility company. The control module stores charge return parameters and generates a charge return control signal based on the charge return request and the charge return parameters. The charge retrieval module returns charge from the battery to the utility company based on the charge return control signal.

In another feature, when the charge return request is consistent with the charge return parameters, the control module and the charge retrieval module return the charge to the utility company.

In another feature, when the charge return request is inconsistent with the charge return parameters, the control module and the network interface module decline the charge return request.

In another feature, when the charge return request is inconsistent with the charge return parameters, the control module negotiates alternate charge return parameters.

In another feature, the charge return request includes a time to begin charge return.

In another feature, the system further comprises a user interface for allowing user entry to define the charge return parameters.

In another feature, the charge return parameters include default charge return parameters.

In another feature, the system further comprises a charge monitoring module that determines a charge level of the battery. The control module evaluates the charge return request based on the charge level of the battery. The charge retrieval module returns the charge from the battery when the charge level is above a predetermined minimum charge level.

In another feature, the network interface module comprises one of a wireline interface, a wireless interface, and a powerline carrier (PLC) interface.

In another feature, the system further comprises an inverter that communicates with the charge retrieval module and that inverts the charge.

In another feature, the control module stores a first set of charging parameters for charging the battery, and the network interface module transmits the first set of charging parameters to the utility company.

In another feature, when the network interface module receives a reply from the utility company, the control module generates a charge control signal based on the reply and the first set of charging parameters, and the system further comprises a charging module that receives power from the utility company and charges the battery based on the charge control signal.

In another feature, the system further comprises a converter that communicates with the charging module and that converts the power from alternating current (AC) power to direct current (DC) power.

In another feature, a vehicle comprises the system and further comprises an electric motor that drives the vehicle, wherein the battery provides power to the electric motor when the electric motor drives the vehicle.

In still other features, a method comprises storing charge return parameters for returning charge from a battery in a vehicle to a utility company, receiving a charge return request from the utility company, and generating a charge return control signal based on the charge return request and the charge return parameters. The method further comprises returning charge from the battery to the utility company based on the charge return control signal.

In another feature, the method further comprises returning the charge to the utility company when the charge return request is consistent with the charge return parameters.

In another feature, the method further comprises declining the charge return request when the charge return request is inconsistent with the charge return parameters.

In another feature, the method further comprises negotiating alternate charge return parameters when the charge return request is inconsistent with the charge return parameters.

In another feature, the charge return request includes a time to begin charge return.

In another feature, the method further comprises receiving input from a user of the vehicle and generating the charge return parameters based on the input.

In another feature, the charge return parameters include default charge return parameters.

In another feature, the method further comprises determining a charge level of the battery. The method further comprises evaluating the charge return request based on the charge level of the battery. The method further comprises returning the charge from the battery when the charge level is above a predetermined minimum charge level.

In another feature, the method further comprises receiving the charge return request and negotiating the alternate charge return parameters via one of a wireline interface, a wireless interface, and a powerline carrier (PLC) interface.

In another feature, the method further comprises inverting the charge.

In another feature, the method further comprises storing a first set of charging parameters for charging the battery and transmitting the first set of charging parameters to the utility company.

In another feature, the method further comprises receiving a reply from the utility company, generating a charge control signal based on the reply and the first set of charging parameters, receiving power from the utility company, and charging the battery based on the charge control signal.

In another feature, the method further comprises converting the power from alternating current (AC) power to direct current (DC) power.

In another feature, the method further comprises at least one of transmitting the first set of charging parameters and receiving the reply via one of a wireline interface, a wireless interface, and a powerline carrier (PLC) interface.

In another feature, the method further comprises providing power from the battery to an electric motor and driving the vehicle using the electric motor.

In still other features, a system comprises network interface means for receiving a charge return request from a utility company for returning charge from a battery in a vehicle to the utility company. The system further comprises control means for storing charge return parameters and generating a charge return control signal based on the charge return request and the charge return parameters. The system further comprises charge retrieval means for returning charge from the battery to the utility company based on the charge return control signal.

In another feature, when the charge return request is consistent with the charge return parameters, the control means and the charge retrieval means return the charge to the utility company.

In another feature, when the charge return request is inconsistent with the charge return parameters, the control means and the network interface means decline the charge return request.

In another feature, when the charge return request is inconsistent with the charge return parameters, the control means negotiates alternate charge return parameters.

In another feature, the charge return request includes a time to begin charge return.

In another feature, the system further comprises user interface means for allowing user entry to define the charge return parameters.

In another feature, the charge return parameters include default charge return parameters.

In another feature, the system further comprises charge monitoring means for determining a charge level of the battery. The control means evaluates the charge return request based on the charge level of the battery. The charge retrieval means returns the charge from the battery when the charge level is above a predetermined minimum charge level.

In another feature, the network interface means comprises one of wireline, wireless, and powerline carrier (PLC) interface means for transmitting and receiving data.

In another feature, the system further comprises inverter means for inverting the charge.

In another feature, the control means stores a first set of charging parameters for charging the battery in the vehicle, and the network interface means transmits the first set of charging parameters to the utility company.

In another feature, when the network interface means receives a reply from the utility company, the control means generates a charge control signal based on the reply and the first set of charging parameters, and the system further comprises charging means for receiving power from the utility company and charging the battery based on the charge control signal.

In another feature, the system further comprises converter means for converting the power from alternating current (AC) power to direct current (DC) power.

In another feature, a vehicle comprises the system and further comprises an electric motor that drives the vehicle, wherein the battery provides power to the electric motor when the electric motor drives the vehicle.

In still other features, a computer program executed by a processor comprises storing charge return parameters for returning charge from a battery in a vehicle to a utility company, receiving a charge return request from the utility company, and generating a charge return control signal based on the charge return request and the charge return parameters. The computer program further comprises returning charge from the battery to the utility company based on the charge return control signal.

In another feature, the computer program further comprises returning the charge to the utility company when the charge return request is consistent with the charge return parameters.

In another feature, the computer program further comprises declining the charge return request when the charge return request is inconsistent with the charge return parameters.

In another feature, the computer program further comprises negotiating alternate charge return parameters when the charge return request is inconsistent with the charge return parameters.

In another feature, the charge return request includes a time to begin charge return.

In another feature, the computer program further comprises receiving input from a user of the vehicle and generating the charge return parameters based on the input.

In another feature, the charge return parameters include default charge return parameters.

In another feature, the computer program further comprises determining a charge level of the battery. The computer program further comprises evaluating the charge return request based on the charge level of the battery. The computer program further comprises returning the charge from the battery when the charge level is above a predetermined minimum charge level.

In another feature, the computer program further comprises receiving the charge return request and negotiating the alternate charge return parameters via one of a wireline interface, a wireless interface, and a powerline carrier (PLC) interface.

In another feature, the computer program further comprises inverting the charge.

In another feature, the computer program further comprises storing a first set of charging parameters for charging the battery and transmitting the first set of charging parameters to the utility company.

In another feature, the computer program further comprises receiving a reply from the utility company, generating a charge control signal based on the reply and the first set of charging parameters, receiving power from the utility company, and charging the battery based on the charge control signal.

In another feature, the computer program further comprises converting the power from alternating current (AC) power to direct current (DC) power.

In another feature, the computer program further comprises at least one of transmitting the first set of charging parameters and receiving the reply via one of a wireline interface, a wireless interface, and a powerline carrier (PLC) interface.

In another feature, the computer program further comprises providing power from the battery to an electric motor and driving the vehicle using the electric motor.

In still other features, a system comprises a network interface module and a load management module. The network interface module receives N first sets of charging parameters from N vehicles for charging batteries in the N vehicles, respectively, where N is an integer greater than 1. The load management module analyzes the N first sets of charging parameters, determines a schedule for charging the batteries of the N vehicles, and generates N replies for the N vehicles based on the schedule. The network interface module transmits the N replies to the N vehicles, respectively.

In another feature, one or more of the N replies specify charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, one or more of the N first sets of charging parameters include charge levels and requested charge completion times for the batteries of corresponding ones of the N vehicles.

In another feature, the load management module selectively retrieves charge from the batteries of selected ones of the N vehicles.

In another feature, the load management module identifies the selected ones of the N vehicles based on charge return parameters provided by the N vehicles.

In another feature, the load management module generates the schedule based on the charge levels and the requested charge completion times.

In another feature, one or more of the N first sets of charging parameters include requested charge completion times, and the load management module generates the schedule based on the requested charge completion times.

In another feature, the load management module determines N recharging payment amounts for the N vehicles based on the N first sets of charging parameters and the N replies, respectively.

In another feature, the load management module negotiates at least one of the N replies with a corresponding one of the N vehicles.

In another feature, one or more of the N first sets of charging parameters include charge levels of the batteries in corresponding ones of the N vehicles, and the load management module selectively retrieves charge from the batteries based on the charge levels.

In another feature, the network interface module comprises one of a wireline interface, a wireless interface, and a powerline carrier (PLC) interface.

In still other features, a method comprises receiving N first sets of charging parameters from N vehicles for charging batteries in the N vehicles, respectively, where N is an integer greater than 1. The method further comprises analyzing the N first sets of charging parameters, determining a schedule for charging the batteries of the N vehicles, generating N replies for the N vehicles based on the schedule, and transmitting the N replies to the N vehicles, respectively.

In another feature, the method further comprises specifying in one or more of the N replies charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, the method further comprises including in one or more of the N first sets of charging parameters charge levels and requested charge completion times for the batteries in corresponding ones of the N vehicles.

In another feature, the method further comprises selectively retrieving charge from the batteries of selected ones of the N vehicles.

In another feature, the method further comprises identifying the selected ones of the N vehicles based on charge return parameters provided by the N vehicles.

In another feature, the method further comprises generating the schedule based on the charge levels and the requested charge completion times.

In another feature, the method further comprises including requested charge completion times in one or more of the N first sets of charging parameters and generating the schedule based on the requested charge completion times.

In another feature, the method further comprises determining N recharging payment amounts for the N vehicles based on the N first sets of charging parameters and the N replies, respectively.

In another feature, the method further comprises negotiating at least one of the N replies with a corresponding one of the N vehicles.

In another feature, the method further comprises including charge levels of the batteries in one or more of the N first sets of charging parameters and selectively retrieving charge from the batteries based on the charge levels.

In another feature, the method further comprises receiving the N first sets of charging parameters, transmitting the N replies, and negotiating the at least one of the N replies via one of a wireline interface, a wireless interface, and a powerline carrier (PLC) interface.

In still other features, a system comprises network interface means for receiving N first sets of charging parameters from N vehicles for charging batteries in the N vehicles, respectively, where N is an integer greater than 1. The system further comprises load management means for analyzing the N first sets of charging parameters, determining a schedule for charging the batteries of the N vehicles, and generating N replies for the N vehicles based on the schedule. The network interface means transmits the N replies to the N vehicles, respectively.

In another feature, one or more of the N replies specify charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, one or more of the N first sets of charging parameters include charge levels and requested charge completion times for the batteries of corresponding ones of the N vehicles.

In another feature, the load management means selectively retrieves charge from the batteries of selected ones of the N vehicles.

In another feature, the load management means identifies the selected ones of the N vehicles based on charge return parameters provided by the N vehicles.

In another feature, the load management means generates the schedule based on the charge levels and the requested charge completion times.

In another feature, one or more of the N first sets of charging parameters include requested charge completion times, and the load management means generates the schedule based on the requested charge completion times.

In another feature, the load management means determines N recharging payment amounts for the N vehicles based on the N first sets of charging parameters and the N replies, respectively.

In another feature, the load management means negotiates at least one of the N replies with a corresponding one of the N vehicles.

In another feature, one or more of the N first sets of charging parameters include charge levels of the batteries of corresponding ones of the N vehicles, and the load management means selectively retrieves charge from the batteries based on the charge levels.

In another feature, the network interface means comprises one of wireline, wireless, and powerline carrier (PLC) interface means for transmitting and receiving data.

In still other features, a computer program executed by a processor comprises receiving N first sets of charging parameters from N vehicles for charging batteries in the N vehicles, respectively, where N is an integer greater than 1. The computer program further comprises analyzing the N first sets of charging parameters, determining a schedule for charging the batteries of the N vehicles, generating N replies for the N vehicles based on the schedule, and transmitting the N replies to the N vehicles, respectively.

In another feature, the computer program further comprises specifying in one or more of the N replies charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, the computer program further comprises including in one or more of the N first sets of charging parameters charge levels and requested charge completion times for the batteries in corresponding ones of the N vehicles.

In another feature, the computer program further comprises selectively retrieving charge from the batteries of selected ones of the N vehicles.

In another feature, the computer program further comprises identifying the selected ones of the N vehicles based on charge return parameters provided by the N vehicles.

In another feature, the computer program further comprises generating the schedule based on the charge levels and the requested charge completion times.

In another feature, the computer program further comprises including requested charge completion times in one or more of the N first sets of charging parameters and generating the schedule based on the requested charge completion times.

In another feature, the computer program further comprises determining N recharging payment amounts for the N vehicles based on the N first sets of charging parameters and the N replies, respectively.

In another feature, the computer program further comprises negotiating at least one of the N replies with a corresponding one of the N vehicles.

In another feature, the computer program further comprises including charge levels of the batteries in one or more of the N first sets of charging parameters and selectively retrieving charge from the batteries based on the charge levels.

In another feature, the computer program further comprises receiving the N first sets of charging parameters, transmitting the N replies, and negotiating the at least one of the N replies via one of a wireline interface, a wireless interface, and a powerline carrier (PLC) interface.

In still other features, a system comprises a network interface module and a load management module. The network interface module receives N first sets of charging parameters from N vehicles for charging batteries in the N vehicles, respectively, where N is an integer greater than 1. At least one of the N first sets of charging parameters for at least one of the N vehicles includes charge return parameters. The load management module selectively retrieves charge from the batteries of the at least one of the N vehicles based on the charge return parameters.

In another feature, the load management module analyzes the N first sets of charging parameters, determines a schedule for charging of the N vehicles, and generates N replies for the N vehicles based on the schedule, respectively.

In another feature, the network interface module transmits the N replies to the N vehicles, respectively.

In another feature, one or more of the N replies specify charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, one or more of the N first sets of charging parameters include charge levels of the batteries of corresponding ones of the N vehicles. The load management module generates the schedule based on the charge levels.

In another feature, one or more of the N first sets of charging parameters include requested charge completion times, and the load management module generates the schedule based on the requested charge completion times.

In another feature, the load management module determines N recharging payment amounts for the N vehicles based on the N first sets of charging parameters and the N replies, respectively.

In another feature, the load management module negotiates at least one of the N replies with a corresponding one of the N vehicles.

In another feature, at least one of the N first sets of charging parameters includes respective charge levels of the batteries, and the load management module selectively retrieves charge from the batteries based on the charge level.

In another feature, the network interface module comprises one of a wireline interface, a wireless interface, and a powerline carrier (PLC) interface.

In still other features, a method comprises receiving N first sets of charging parameters from N vehicles for charging batteries in the N vehicles, respectively, where N is an integer greater than 1. At least one of the N first sets of charging parameters for at least one of the N vehicles includes charge return parameters. The method further comprises selectively retrieving charge from the batteries of the at least one of the N vehicles based on the charge return parameters.

In another feature, the method further comprises analyzing the N first sets of charging parameters, determining a schedule for charging of the N vehicles, and generating N replies for the N vehicles based on the schedule, respectively.

In another feature, the method further comprises transmitting the N replies to the N vehicles, respectively.

In another feature, the method further comprises specifying in one or more of the N replies charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, the method further comprises including charge levels of one or more of the batteries in corresponding ones of the N first sets of charging parameters. The method further comprises generating the schedule based on the charge levels.

In another feature, the method further comprises including requested charge completion times in one or more of the N first sets of charging parameters and generating the schedule based on the requested charge completion times.

In another feature, the method further comprises determining recharging payment amounts for the N vehicles based on the N first sets of charging parameters and the N replies, respectively.

In another feature, the method further comprises negotiating at least one of the N replies with a corresponding one of the N vehicles.

In another feature, the method further comprises including charge levels of the batteries in one or more of the N first sets of charging parameters and selectively retrieving charge from the batteries based on the charge levels.

In another feature, the method further comprises receiving the N first sets of charging parameters, transmitting the N replies, and negotiating the at least one of the N replies via one of a wireline interface, a wireless interface, and a powerline carrier (PLC) interface.

In still other features, a system comprises network interface means for receiving N first sets of charging parameters from N vehicles for charging batteries in the N vehicles, respectively, where N is an integer greater than 1. At least one of the N first sets of charging parameters for at least one of the N vehicles includes charge return parameters. The system further comprises load management means for selectively retrieving charge from the batteries of the at least one of the N vehicles based on the charge return parameters.

In another feature, the load management means analyzes the N first sets of charging parameters, determines a schedule for charging of the N vehicles, and generates N replies for the N vehicles based on the schedule, respectively.

In another feature, the network interface means transmits the N replies to the N vehicles, respectively.

In another feature, one or more of the N replies specify charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, one or more of the N first sets of charging parameters include charge levels of the batteries of corresponding ones of the N vehicles. The load management means generates the schedule based on the charge levels.

In another feature, one or more of the N first sets of charging parameters include requested charge completion times, and the load management means generates the schedule based on the requested charge completion times.

In another feature, the load management means determines N recharging payment amounts for the N vehicles based on the N first sets of charging parameters and the N replies, respectively.

In another feature, the load management means negotiates at least one of the N replies with a corresponding one of the N vehicles.

In another feature, at least one of the N first sets of charging parameters includes respective charge levels of the batteries, and the load management means selectively retrieves charge from the batteries based on the charge level.

In another feature, the network interface means comprises one of wireline, wireless, and powerline carrier (PLC) interface means for transmitting and receiving data.

In still other features, a computer program executed by a processor comprises receiving N first sets of charging parameters from N vehicles for charging batteries in the N vehicles, respectively, where N is an integer greater than 1. At least one of the N first sets of charging parameters for at least one of the N vehicles includes charge return parameters. The computer program further comprises selectively retrieving charge from the batteries of the at least one of the N vehicles based on the charge return parameters.

In another feature, the computer program further comprises analyzing the N first sets of charging parameters, determining a schedule for charging of the N vehicles, and generating N replies for the N vehicles based on the schedule, respectively.

In another feature, the computer program further comprises transmitting the N replies to the N vehicles, respectively.

In another feature, the computer program further comprises specifying in one or more of the N replies charging parameters that are different than corresponding ones of the N first sets of charging parameters.

In another feature, at least one of the N first sets of charging parameters includes a first time to begin charging, and a corresponding one of the N replies includes a second time to begin charging that is different than the first time.

In another feature, the computer program further comprises including charge levels of one or more of the batteries in corresponding ones of the N first sets of charging parameters. The computer program further comprises generating the schedule based on the charge levels.

In another feature, the computer program further comprises including requested charge completion times in one or more of the N first sets of charging parameters and generating the schedule based on the requested charge completion times.

In another feature, the computer program further comprises determining recharging payment amounts for the N vehicles based on the N first sets of charging parameters and the N replies, respectively.

In another feature, the computer program further comprises negotiating at least one of the N replies with a corresponding one of the N vehicles.

In another feature, the computer program further comprises including charge levels of the batteries in one or more of the N first sets of charging parameters and selectively retrieving charge from the batteries based on the charge levels.

In another feature, the computer program further comprises receiving the N first sets of charging parameters, transmitting the N replies, and negotiating the at least one of the N replies via one of a wireline interface, a wireless interface, and a powerline carrier (PLC) interface.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
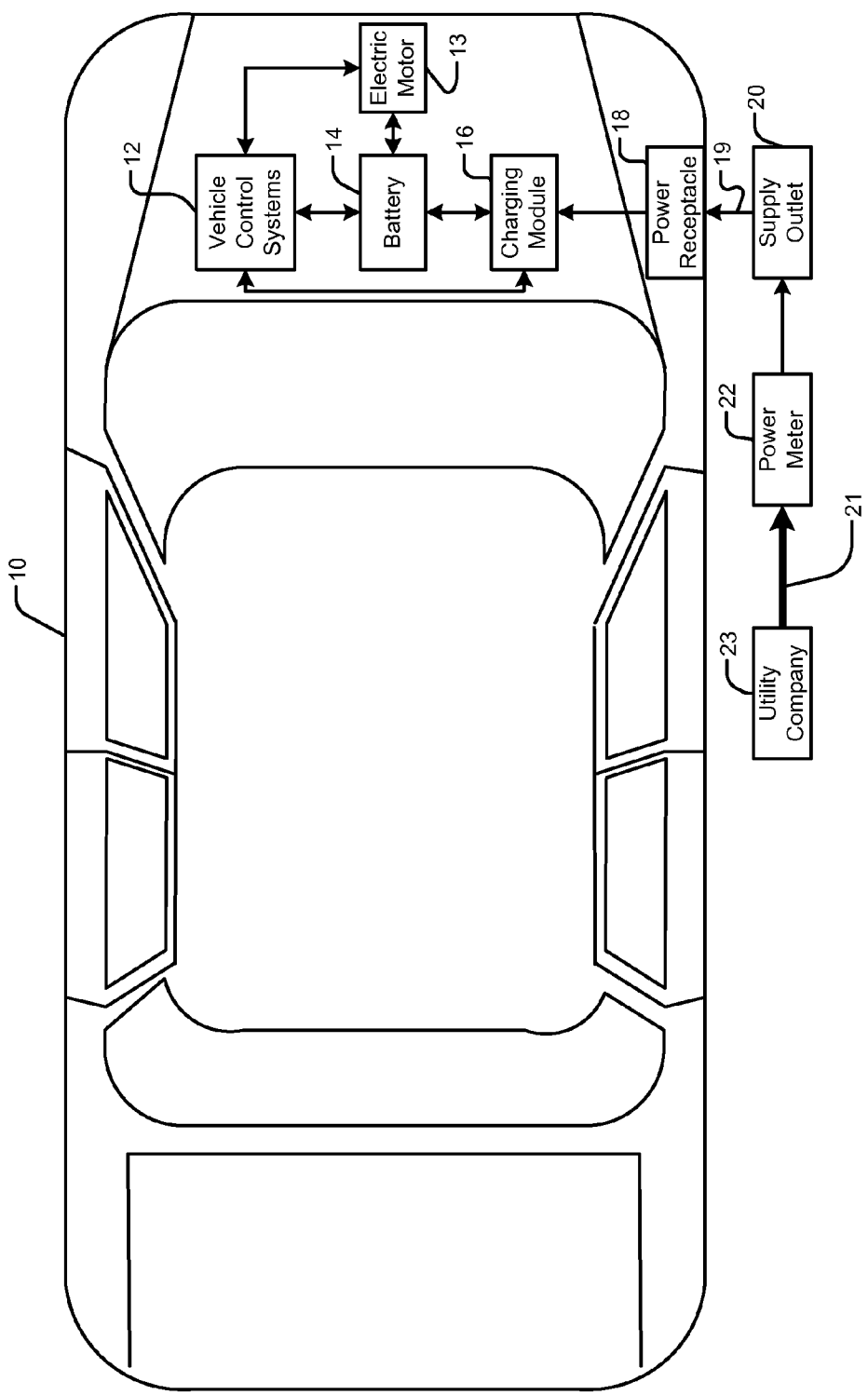
FIG. 1 depicts a vehicle according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
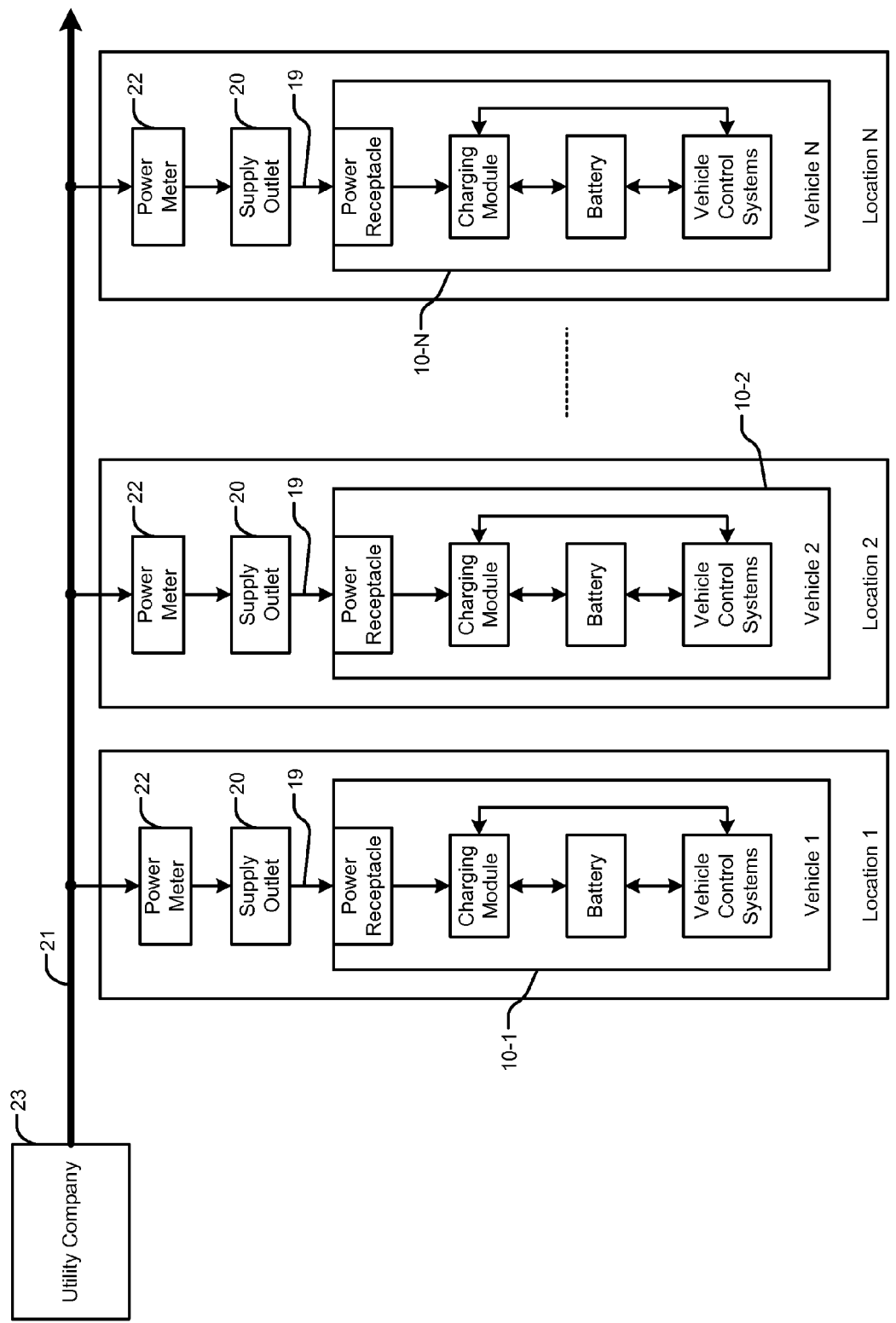
FIG. 2 depicts vehicles at multiple locations receiving power from a utility company to charge vehicle batteries.

Referring now to FIG. 2, an increasing number of users of vehicles may attempt to simultaneously recharge batteries in vehicles as use of vehicles with rechargeable batteries and electric motors proliferates. For example, users at locations 1, 2, . . . , N may choose to recharge batteries in vehicles 10-1, 10-2, . . . , 10-N, respectively, where N is an integer greater than 1. Many people arrive home after work at about the same time such as between 5 pm and 7 pm. If a significant number of these people plug in their vehicles for recharging batteries at the same time, the demand for power may exceed the available supply. Furthermore, the utility may still experience relatively high demand from other users for other purposes until 9 pm or 10 pm and relatively low demand from approximately 11 pm until 6 am.

Additionally, some users may attempt to recharge batteries in two or more vehicles at the same time at a given location. Consequently, the demand for power to recharge batteries and the load on a power distribution system of the utility company 23 may significantly increase since the utility company 23 may have to simultaneously supply power to users at locations 1, 2, . . . , N.

According to the present disclosure, utility companies may employ a charge management system (CMS) to coordinate charging of batteries in vehicles at multiple locations. Additionally, utility companies may take back charge from selected ones of the batteries via the CMS to facilitate load management if needed. In other words, some users may plug in their vehicles at 6 pm and request recharging by 6 am. Batteries in these vehicles may have charge remaining (for example, 50%, 60% or higher charge remaining). If users of these vehicles do not need to have the batteries recharged immediately, the CMS may take charge from these batteries to facilitate charging of batteries in other vehicles and recharge these batteries later during periods of lower demand.

The vehicles may be equipped with a charge management module (CMM) that may communicate with utility companies via local area networks (LANs) or powerline carrier systems (PLCs). Users of the vehicles may generate default charging parameters for charging batteries on a daily basis and/or parameters for returning charge from the batteries. Additionally, users may create custom charging parameters when requesting charging at times other than default times. Collectively, these parameters may be called charging parameters.

The CMM may communicate the charging parameters to the utility companies via the CMS. In some circumstances, users may interact with utility companies to negotiate alternate charging parameters. Utility companies may supply power to the batteries and/or take back charge from the batteries according to the charging parameters generated by the users or the alternate charging parameters negotiated by the utility companies and the users.

Figure 3A:
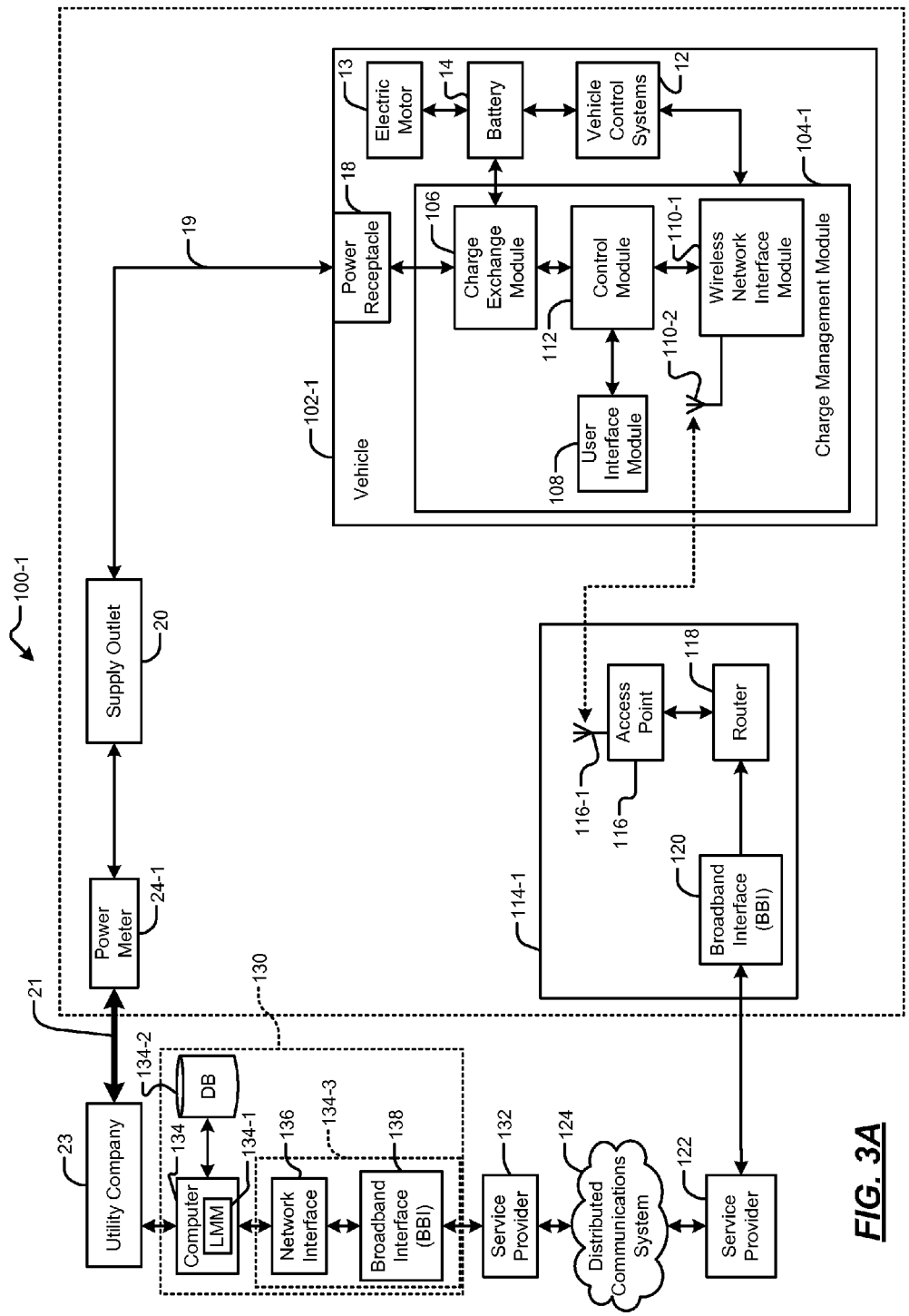
FIG. 3A is a functional block diagram of an exemplary system employing a wireless local area network (LAN) to control charging a battery in a vehicle according to the present disclosure.
Figure 3B:
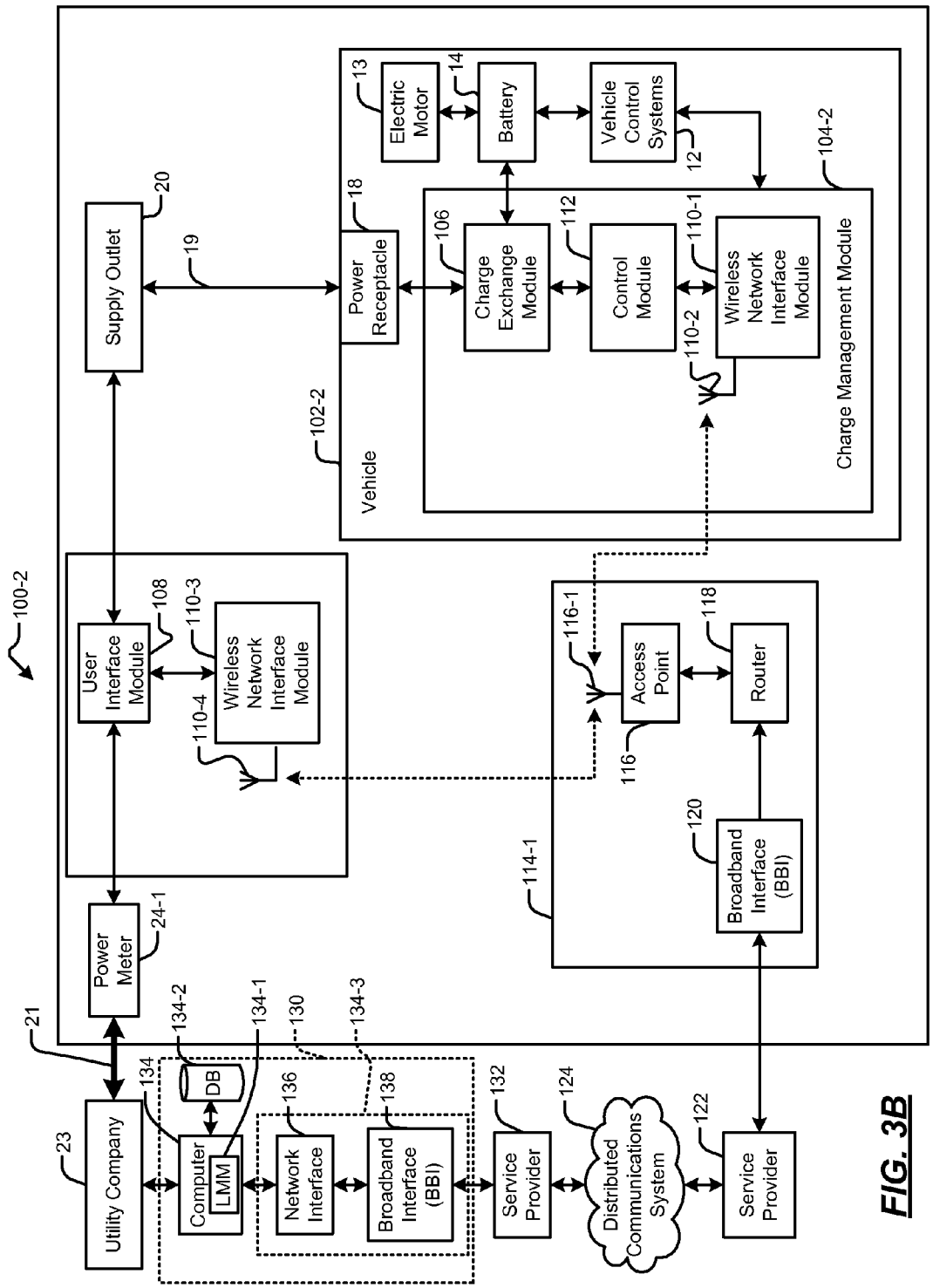
FIG. 3B is a functional block diagram of an exemplary system employing a wireless local area network (LAN) to control charging a battery in a vehicle according to the present disclosure.
Figure 4A:
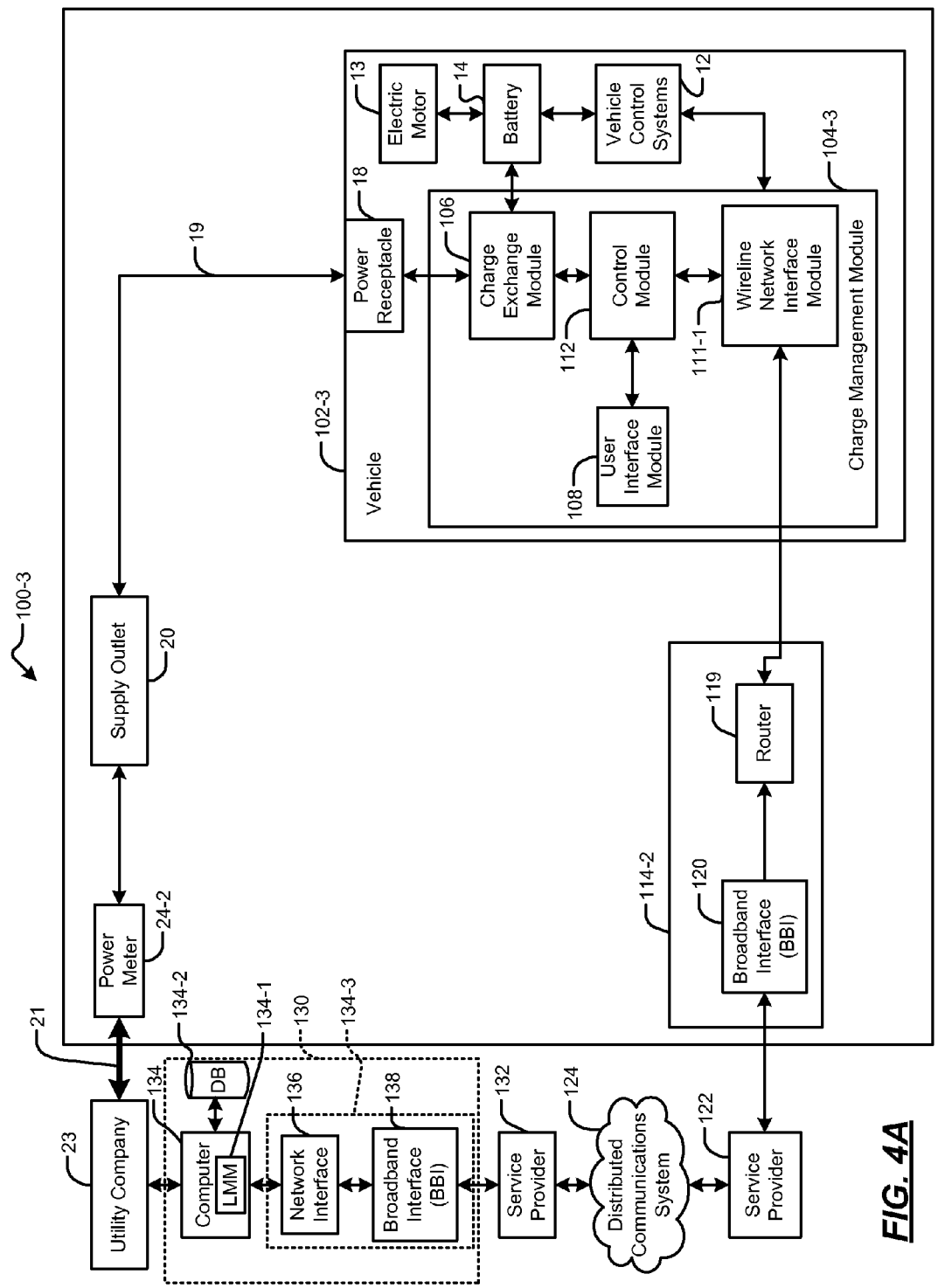
FIG. 4A is a functional block diagram of an exemplary system employing a wireline local area network (LAN) to control charging a battery in a vehicle according to the present disclosure.
Figure 4B:
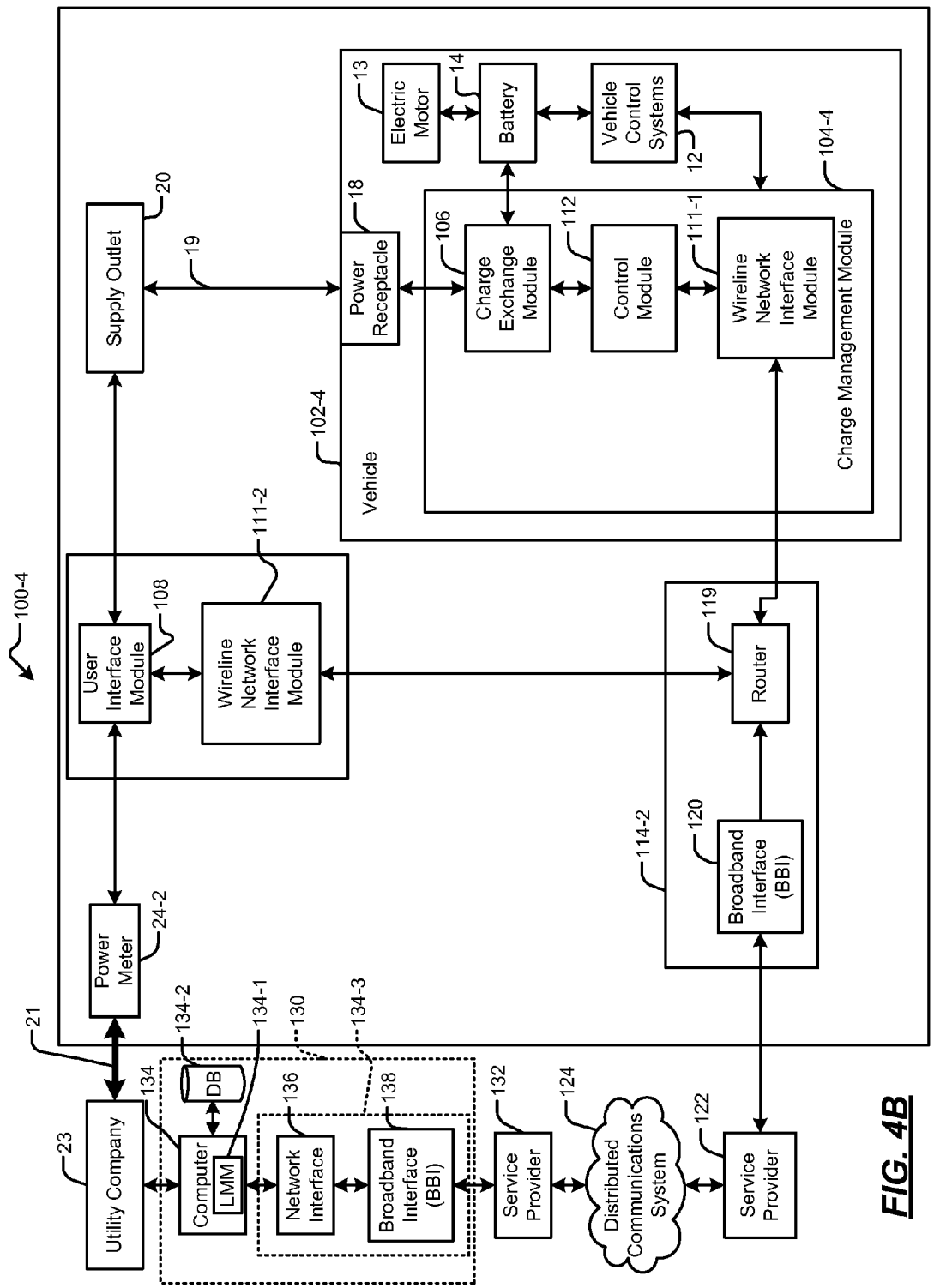
FIG. 4B is a functional block diagram of an exemplary system employing a wireline local area network (LAN) to control charging a battery in a vehicle according to the present disclosure.
Figure 5A:
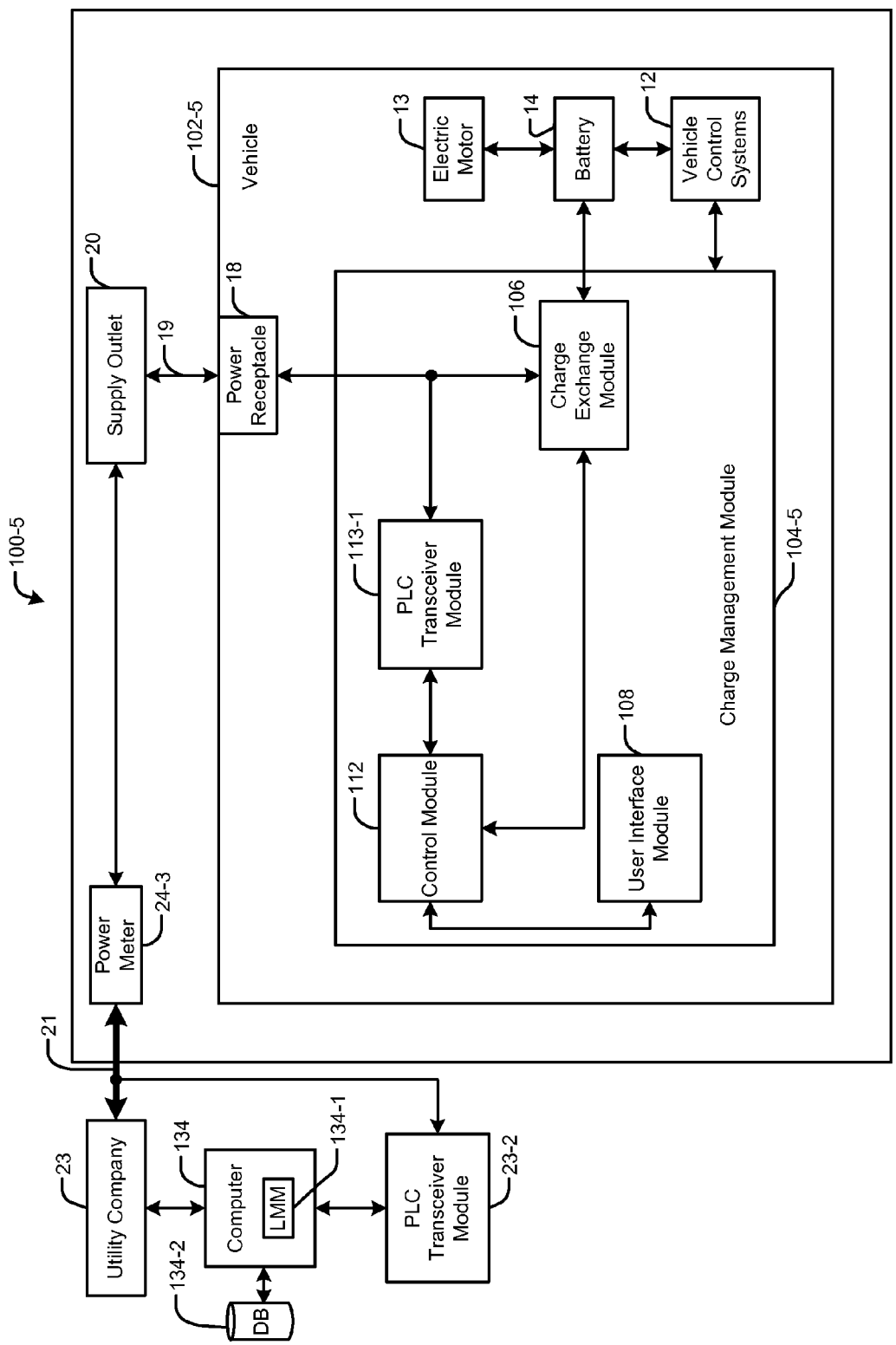
FIG. 5A is a functional block diagram of an exemplary system employing a powerline carrier (PLC) system to control charging a battery in a vehicle according to the present disclosure.
Figure 5B:
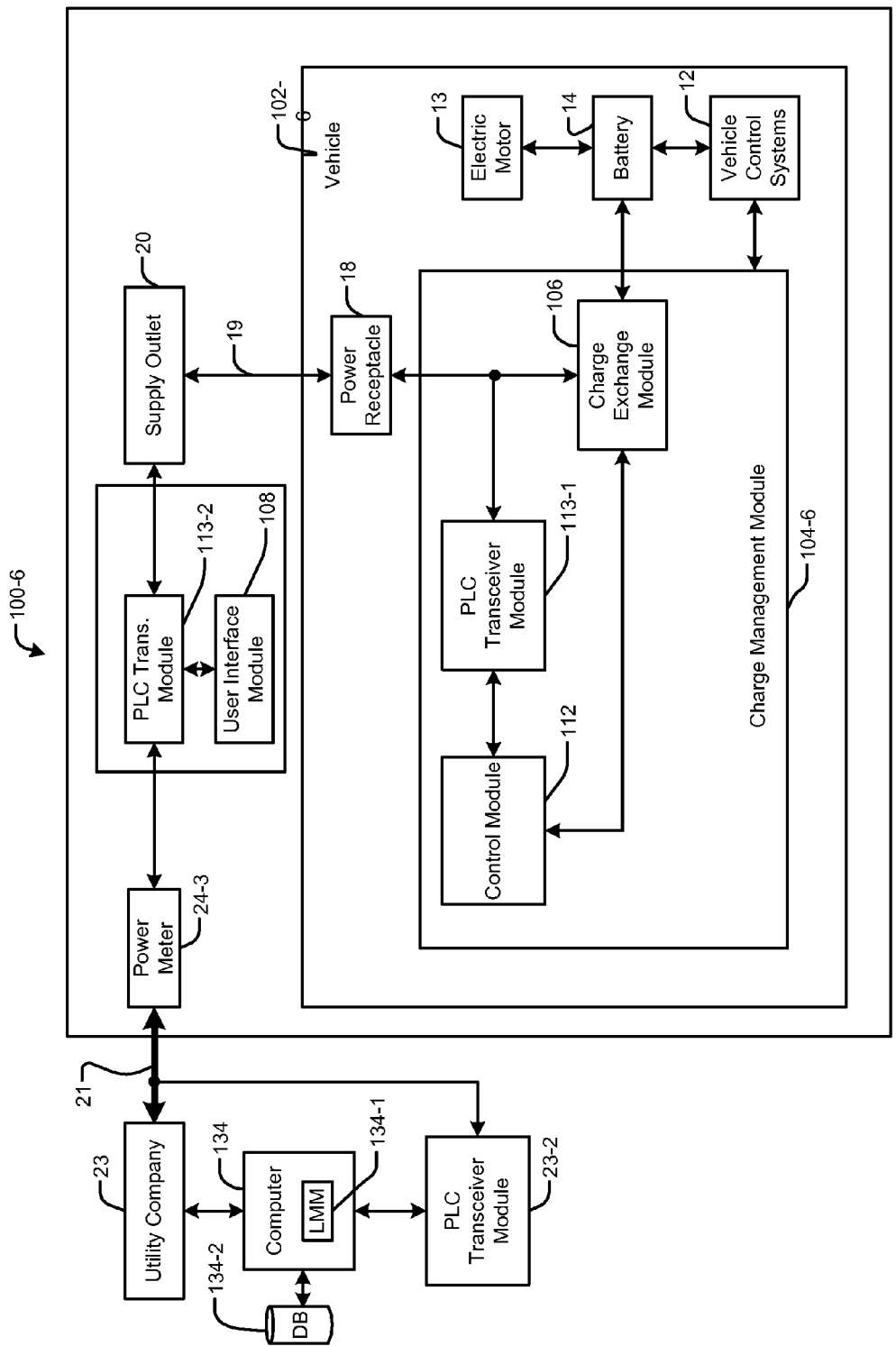
FIG. 5B is a functional block diagram of an exemplary system employing a powerline carrier (PLC) system to control charging a battery in a vehicle according to the present disclosure.

Referring generally to FIGS. 3A-5B, the CMS may be implemented using wireless LANs as shown in FIGS. 3A and 3B, wireline LANs as shown in FIGS. 4A and 4B, and/or PLCs as shown in FIGS. 5A and 5B. The CMS may comprise user interface modules that users may use to generate the charging parameters and to interact with utility companies. The user interface modules may be arranged inside vehicles as shown in FIGS. 3A, 4A, and 5A or outside vehicles as shown in FIGS. 3B, 4B, and 5B.

In a CMS, users may use the user interface modules to generate default and/or custom charging parameters. The charging parameters may specify a time of the day to charge the batteries, a charge completion time, a priority at which the batteries may be charged, and an expected time when the vehicles will be used next. Additionally, the charging parameters may include costs the users may pay if batteries are charged at higher than normal priority, etc. For example in the default charging parameters, users may indicate that the utility company may choose the time to charge the batteries when the cost is lowest.

Occasionally, users may request utility companies to charge the batteries at times and frequencies other than the times and frequencies specified in the default charging parameters. For example, users may request charging more frequently on weekends than on weekdays. In that case, users may generate custom charging parameters and approve predetermined additional costs that the users may pay to automatically receive power from utility companies as requested. Alternatively, users and utility companies may create alternate charging parameters by interactively negotiating costs and/or alternate times for charging the batteries. For example, utility companies may offer discounts to users when the users are willing to accept receiving power at other times.

Additionally, users may indicate whether they agree to return the charge, the amount of charge the users may return, etc. For example, at the end of the day, users may wish to retain a minimum charge (e.g., 25%) in the batteries for emergency use and return the rest provided that the utility companies charge the batteries before the time of next use arrives. The utility companies may offer credit to users for returning the charge. The amount of credit may depend on the demand for power, and the ability of utility companies to supply power when the users wish to return the charge and the amount of charge actually returned.

When utility companies receive charging parameters from the CMM in vehicles via the CMS, the utility companies may analyze the charging parameters and assess the load on the power distribution systems. Utility companies may interact with users to determine alternate charging parameters if the utility companies cannot supply power as requested by the users. Accordingly, utility companies may supply power to users based on charging parameters generated by users or based on alternate charging parameters negotiated by interacting with the users. With this flexibility, the utility companies may be able to balance the load on the distribution systems.

In FIG. 3A, a CMS 100-1 is shown. A vehicle 102-1 is charged at a location such as a home or work location. The vehicle 102-1 includes the vehicle control systems 12, the electric motor 13, the battery 14, a CMM 104-1, and the power receptacle 18. The vehicle 102-1 may or may not include an engine. The vehicle control systems 12 may control the operation of the vehicle 102-1 as previously described. During operation, the battery 14 may provide power to the electric motor 13 and/or the vehicle control systems 12. The CMM 104-1 may communicate with the battery 14 and the power receptacle 18 and may manage the amount of charge in the battery 14.

The location may include the supply outlet 20 that may receive power from the utility company 23 via the power distribution line 21. The cable and connector 19 may connect the supply outlet 20 to the power receptacle 18 of the vehicle 102-1. The vehicle 102-1 may draw power from the supply outlet 20 to charge the battery 14 or may return charge from the battery 14 to the utility company 23 via the supply outlet 20. A power meter 24-1 may measure the amount of power exchanged between the utility company 23 and the vehicle 102-1 via the supply outlet 20.

The CMM 104-1 charges the battery 14 using the power supplied by the utility company 23 to the supply outlet 20. Additionally, the CMM 104-1 may return charge from the battery 14 to the utility company 23 via the supply outlet 20.

The CMM 104-1 includes a charge exchange module 106, a user interface module 108, a wireless network interface module 110-1, and a control module 112.

The charge exchange module 106 may monitor the amount of charge in the battery 14, may communicate data regarding the amount of charge in the battery 14 to the control module 112, and may exchange charge between the battery 14 and the power receptacle 18. Specifically, the charge exchange module 106 charges the battery 14 using the power received from the utility company 23 via the supply outlet 20 and may return charge from the battery 14 to the utility company 23 via the supply outlet 20.

The user interface module 108 may comprise a keypad, a display, a microphone, and/or a speaker (all not shown). A user of the vehicle 102-1 may use the user interface module 108 to set charging parameters for charging the battery 14 and for returning charge from the battery 14. The wireless network interface module 110-1 may enable communication between the utility company 23 and the CMM 104-1. The control module 112 may communicate with the charge exchange module 106, the user interface module 108, and the wireless network interface module 110-1 and may control the operation of the CMM 104-1.

Specifically, the control module 112 may receive data relating to the amount of charge present in the battery 14 (i.e., a charge level of the battery 14) from the charge exchange module 106. Additionally, the control module 112 may receive data input by the user for charging the battery 14 and for returning charge from the battery 14 from the user interface module 108. The CMM 104-1 may transmit the data received by the control module 112 to the utility company 23 via the wireless network interface module 110-1. The data may be exchanged when the vehicle is plugged in and/or at other times.

The CMM 104-1 may communicate with the utility company 23 via a wireless LAN 114-1 operating at the location. The CMM 104-1 may communicate with the wireless LAN 114-1 via the wireless network interface module 110-1, which may include an antenna 110-2.

The wireless LAN 114-1 may include an access point 116 having an antenna 116-1, a router 118, and a broadband interface (BBI) 120. The BBI 120 may include a modem and may communicate with a service provider 122. The service provider 122 may provide a link between the wireless LAN 114-1 and a distributed communication system 124 such as the Internet. Thus, the CMM 104-1 in the vehicle 102-1 may communicate with the distributed communication system 124 via the wireless LAN 114-1.

In FIG. 3B, a CMS 100-2 may include the user interface module 108 that is arranged outside a vehicle 102-2. For example, the user interface module 108 may be arranged adjacent to the power meter 24-1 and/or the supply outlet 20. The user interface module 108 may communicate with the wireless LAN 114-1 via a wireless network interface module 110-3 having an antenna 110-4. The user interface module 108 and the wireless network interface module 110-3 may optionally be implemented by a single module. The wireless network interface module 110-3 may enable the user interface module 108 to communicate with the utility company 23. Additionally, the wireless network interface module 110-3 may enable the user interface module 108 to communicate with a CMM 104-2 in the vehicle 102-2 via the user LAN 114-1. Otherwise, the CMS 100-2 of FIG. 3B may be substantially similar to the CMS 100-1 of FIG. 3A.

In FIG. 4A, a CMS 100-3 is shown. A vehicle 102-3 may include a CMM 104-3 that includes the user interface module 108 and a wireline network interface module 111-1. The wireline network interface module 111-1 may enable the CMM 104-3 to communicate with the utility company 23 via a wireline LAN 114-2. The wireline LAN 114-2 may comprise a router 119 and the BBI 120. Otherwise, the CMS 100-3 of FIG. 4A may be substantially similar to the CMS 100-1 of FIG. 3A.

In FIG. 4B, a CMS 100-4 may include the user interface module 108 that is arranged outside a vehicle 102-4. For example, the user interface module 108 may be arranged adjacent to a power meter 24-2 and/or the supply outlet 20. The user interface module 108 may communicate with the wireline LAN 114-2 via a wireline network interface module 111-2. The user interface module 108 and the wireline network interface module 111-2 may optionally be implemented by a single module. The wireline network interface module 111-2 may enable the user interface module 108 to communicate with the utility company 23. Additionally, the wireline network interface module 111-2 may enable the user interface module 108 to communicate with a CMM 104-4 in the vehicle 102-4 via the user LAN 114-2. Otherwise, the CMS 100-4 of FIG. 4B may be substantially similar to the CMS 100-3 of FIG. 4A.

Hereinafter, the vehicles 102-1, 102-2, 102-3, and 102-4 may be collectively referred to as vehicle 102; the CMMs 104-1, 104-2, 104-3, and 104-4 may be collectively referred to as CMM 104; and the wireless and wireline LANs 114-1, 114-2 may be collectively referred to as LAN 114. Additionally, the wireless network interface modules 110-1, 110-3 and the wireline network interface modules 111-1, 111-2 may be collectively referred to as network interface module 110.

The utility company 23 may receive the charging parameters generated by the user and may respond to requests for charging the battery 14. The utility company 23 may transmit a reply to the user indicating whether power can be supplied as requested. The utility company may propose alternate charging parameters. Additionally, the utility company 23 may determine from the charging parameters if the user may return charge from the battery 14.

Referring now to FIGS. 3A-4B, the utility company 23 may communicate with the CMM 104 in the vehicle 102 via a LAN 130. The LAN 130 may include at least one computer 134 with a load management module (LMM) 134-1. Additionally, the LAN 130 may comprise a database 134-2 and a communication module 134-3, which may include a network interface 136 and a BBI 138. The network interface 136 may be a wireless and/or a wireline LAN interface and may communicate via the BBI 138 with a service provider 132. The service provider 132 may provide a link between the LAN 130 and the distributed communication system 124. Thus, the utility company 23 may communicate with the CMM 104 in the vehicle 102 and/or the user of the vehicle 102 via the LAN 130, the distributed communication system 124, and the LAN 114. While a single computer 134 is shown, multiple computers may be used.

Additionally, the utility company 23 may communicate with CMMs and/or users of other vehicles at other locations. The communication module 134-3 may receive charging parameters from CMMs and/or users of multiple vehicles. The LMM 134-1 may analyze the load on the distribution system based on the requested charging parameters from multiple customers. The LMM 134-1 may determine a schedule for charging batteries in multiple vehicles. The LMM 134-1 may generate alternate charging parameters and generate replies to be transmitted to multiple users. The communication module 134-3 may communicate the replies including alternate charging parameters to the CMMs and/or users. The computer 134 may store the charging parameters and/or the alternate charging parameters in the database 134-2. Additionally, the computer 134 may identify users that may return the charge and store the information in the database 134-2.

In FIG. 5A, a CMS 100-5 may utilize PLCs instead of LANs to enable communication between the utility company 23, a vehicle 102-5, and a user of the vehicle 102-5. Specifically, the vehicle 102-5 may comprise a CMM 104-5 that includes the user interface module 108 and a PLC transceiver module 113-1. The CMM 104-5 may communicate with the utility company 23 via the PLC transceiver module 113-1. Additionally, the user of the vehicle 102-5 may use the user interface module 108 to communicate with the utility company 23 via the PLC transceiver module 113-1.

Specifically, the PLC transceiver module 113-1 may transmit and receive data to and from the utility company 23 via the supply outlet 20. That is, the PLC transceiver module 113-1 may transmit and receive data through the same power distribution line 21 that distributes power from the utility company 23 to the supply outlet 20. PLC transceivers selectively superimpose a high frequency signal at zero crossings of the power line carrier to represent data. Presence or absence of the high frequency signal may be used to represent binary data. The CMM 104-5 may transmit data collected by the control module 112 from the user interface module 108 and the charge exchange module 106 to the utility company 23 via the PLC transceiver module 113-1.

The computer 134 located at the utility company 23 may comprise the LMM 134-1. The LMM 134-1 may receive and transmit data via a PLC transceiver module 23-2 that communicates with the power distribution line 21. The LMM 134-1 may receive the charging parameters transmitted by the CMM 104-5 and/or the user. The LMM 134-1 may transmit alternate charging parameters to the supply outlet 20. The computer 134 may store the charging parameters and/or the alternate charging parameters in the database 134-2.

The PLC transceiver module 113-1 may receive the data transmitted by the LMM 134-1 and may provide the data to the control module 112. The control module 112 may, in turn, provide the data to the charge exchange module 106. Additionally, the control module 112 may provide the data to the user via the user interface module 108. Otherwise, the CMS 100-5 of FIG. 5A may be substantially similar to the CMS 100-1 of FIG. 3A.

In FIG. 5B, a CMS 100-6 may include the user interface module 108 that is located outside a vehicle 102-6. For example, the user interface module 108 may be located adjacent to a power meter 24-3 and/or the supply outlet 20. The user interface module 108 may communicate with a PLC transceiver module 113-2. The user interface module 108 and the PLC transceiver module 113-2 may be implemented by a single module. The PLC transceiver module 113-2 may enable the user interface module 108 to communicate with the utility company 23. Additionally, the PLC transceiver module 113-2 may enable the user interface module 108 to communicate with a CMM 104-6 in the vehicle 102-6 via the supply outlet 20. Otherwise, the CMS 100-6 of FIG. 5B may be substantially similar to the CMS 100-5 of FIG. 5A.

Figure 6A:
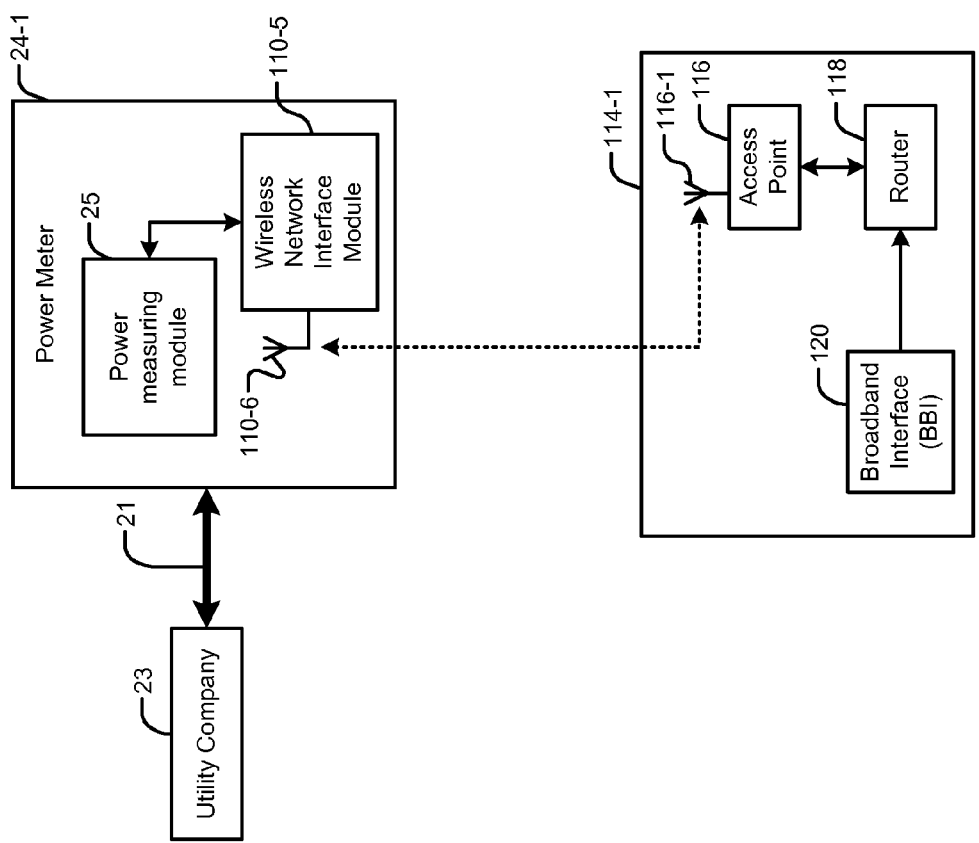
FIG. 6A is a functional block diagram of an exemplary power meter employing a wireless communication interface for communicating with a utility company according to the present disclosure.
Figure 6B:
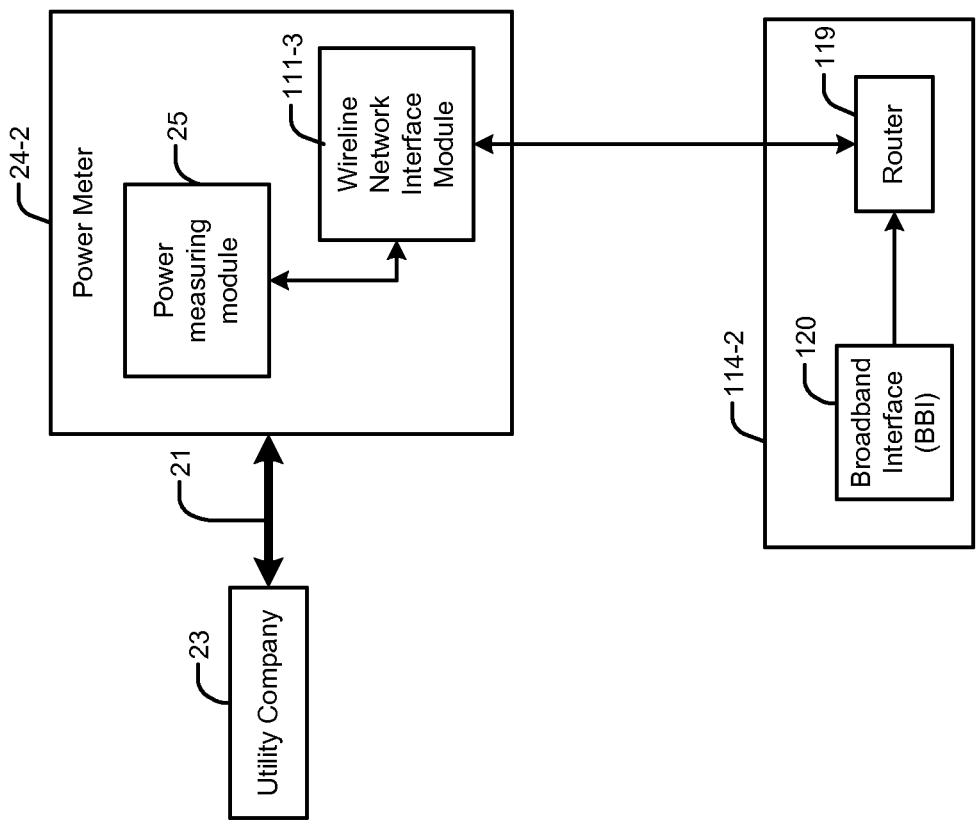
FIG. 6B is a functional block diagram of an exemplary power meter employing a wireline communication interface for communicating with a utility company according to the present disclosure.
Figure 6C:
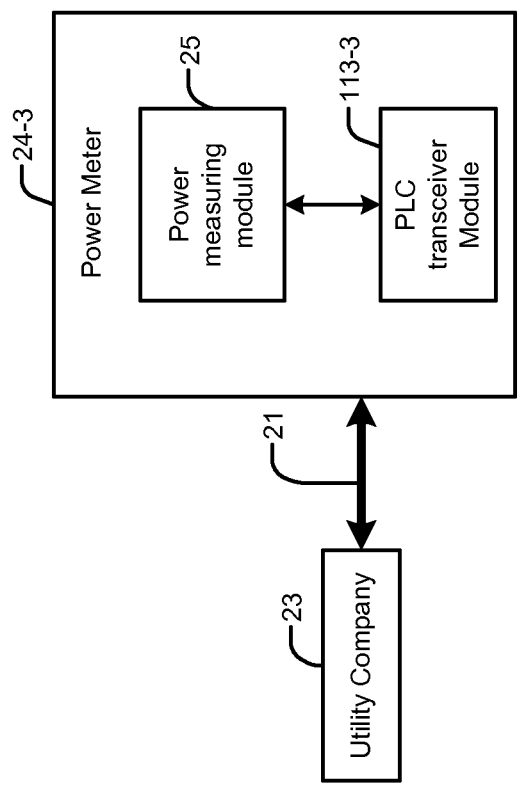
FIG. 6C is a functional block diagram of an exemplary power meter employing a powerline carrier (PLC) interface for communicating with a utility company according to the present disclosure.

Referring generally to FIGS. 6A-6C, power meters 24-1, 24-2, and 24-3 (collectively 24) are shown in FIGS. 3A-3B, 4A-4B, and 5A-5B, respectively. The power meters 24 may comprise a power measuring module 25 that measures power supplied to the supply outlet 20 by the utility company 23 and the power returned to the utility company 23 from the battery 14 via the supply outlet 20. The power measuring module 25 may generate data indicating the amount of power exchanged between the utility company 23 and the supply outlet 20.

Additionally, the power meters 24 may be equipped with communication interfaces that enable the power meters 24 to communicate the data to the utility company 23.

In FIG. 6A, the power meter 24-1 may comprise a wireless network interface module 110-5 having an antenna 110-6. The power meter 24-1 may communicate with the wireless LAN 114-1 using the wireless network interface module 110-5. Thus, the power meter 24-1 may communicate with the utility company 23 via the wireless LAN 114-1. In FIG. 6B, the power meter 24-2 may comprise a wireline network interface module 111-3. The power meter 24-2 may communicate with the wireline LAN 114-2 using the wireline network interface module 111-3. Thus, the power meter 24-2 may communicate with the utility company 23 via the wireline LAN 114-2. In FIG. 6C, the power meter 24-3 may comprise a PLC transceiver module 113-3. The power meter 24-3 may communicate with the utility company 23 via the PLC transceiver module 113-3.

Hereinafter, the vehicles 102-1, 102-2, 102-3, 102-4, 102-5, and 102-6 may be collectively referred to as vehicle 102. The CMMs 104-1, 104-2, 104-3, 104-4, 104-5, and 104-6 may be collectively referred to as CMM 104. Additionally, the CMSs 100-1, 100-2, 100-3, 100-4, 100-5, and 100-6 may be collectively referred to as CMS 100.

More specifically, the CMS 100 may manage the charging of the battery 14 and/or returning of charge from the battery 14 as follows. The user may use the user interface module 108 to generate charging parameters comprising the time at which the battery 14 may be charged, etc. For example, the user may request a full charge daily between 9 pm and 6 am. Accordingly, the user may input charging parameters that include the daily charging times using the user interface module 108. The charging parameters may be stored in the CMM 104. When the user plugs the vehicle 102 into the supply outlet 20 at the end of the day, the CMM 104 may transmit the charging parameters to the utility company 23. The utility company 23 may charge the battery 14 between 9 pm and 6 am without interacting with the user.

Depending on the number of users simultaneously requesting charge and depending on the load on the distribution system, the utility company 23 may supply power in a staggered manner to multiple users requesting charging between 9 pm and 6 am. For example, the utility company 23 may schedule charging as follows. The utility company 23 may supply power to a first set of users from 9 pm to 10 pm, to a second set of users from 10 pm to 11 pm, etc. Subsequently, the utility company 23 may supply power to the first set of users from 3 am to 4 am, etc. Eventually, users requesting charge by 6 am may receive the requested charge by 6 am. Thus, the utility company 23 may control charging times, etc. of the batteries in multiple vehicles without loading the power distribution system.

Occasionally, the user may use the user interface module 108 to interact with the utility company 23 and input requests for charging the battery 14 at times other than the default times. For example, the user may input a request for charging at 5 pm on a given day. Depending on the load on the distribution system, the utility company 23 may inform the user if the utility company 23 can supply power to the user at the requested time. If not, the utility company 23 may respond with an alternate schedule depending on the request received from the user. For example, the utility company 23 may inform the user of any extra cost the user may incur if the utility company 23 supplies power at the requested time or a discount the user may receive if the user accepts power at a different time. Thus, the alternate charging parameters may include alternate charging times, additional costs, discounts, etc.

The user may include in the schedule a pre-approval for a predetermined amount of additional cost that the user may pay if the utility company supplies power as requested. In that case, the utility company 23 may receive an automatic approval for the extra cost from the CMM 104. Alternatively, the user may respond interactively. That is, the user may accept, decline, or negotiate the additional cost and/or alternate charging times suggested by the utility company 23 by interacting with the utility company 23 using the user interface module 108. Alternatively, standard rates at various times may be predetermined.

Occasionally, the user may inform the utility company 23 via the charging parameters that the utility company 23 may take back charge from the battery 14. The user may indicate that a minimum charge level (e.g., 25%) that must be left in the battery 14. The minimum charge may also be called a safe level of charge. The utility company 23 may take back the charge if the load on the distribution system is high and if the utility company 23 needs extra power to fulfill demand. The utility company 23 may take back any extra charge (e.g., charge in excess of 25%) from the battery 14 and credit the user for returning the charge.

The control module 112 in the CMM 104 may control the charging of the battery 14 and returning of the charge from the battery 14 based on the charging parameters and/or the alternate charging parameters. Specifically, the control module 112 may receive data from the charge exchange module 106 regarding the amount of charge in the battery 14. Additionally, the control module 112 may receive charging parameters input by the user and/or alternate charging parameters transmitted by the utility company 23. The control module 112 may provide the charging parameters to the charge exchange module 106.

Figure 7:
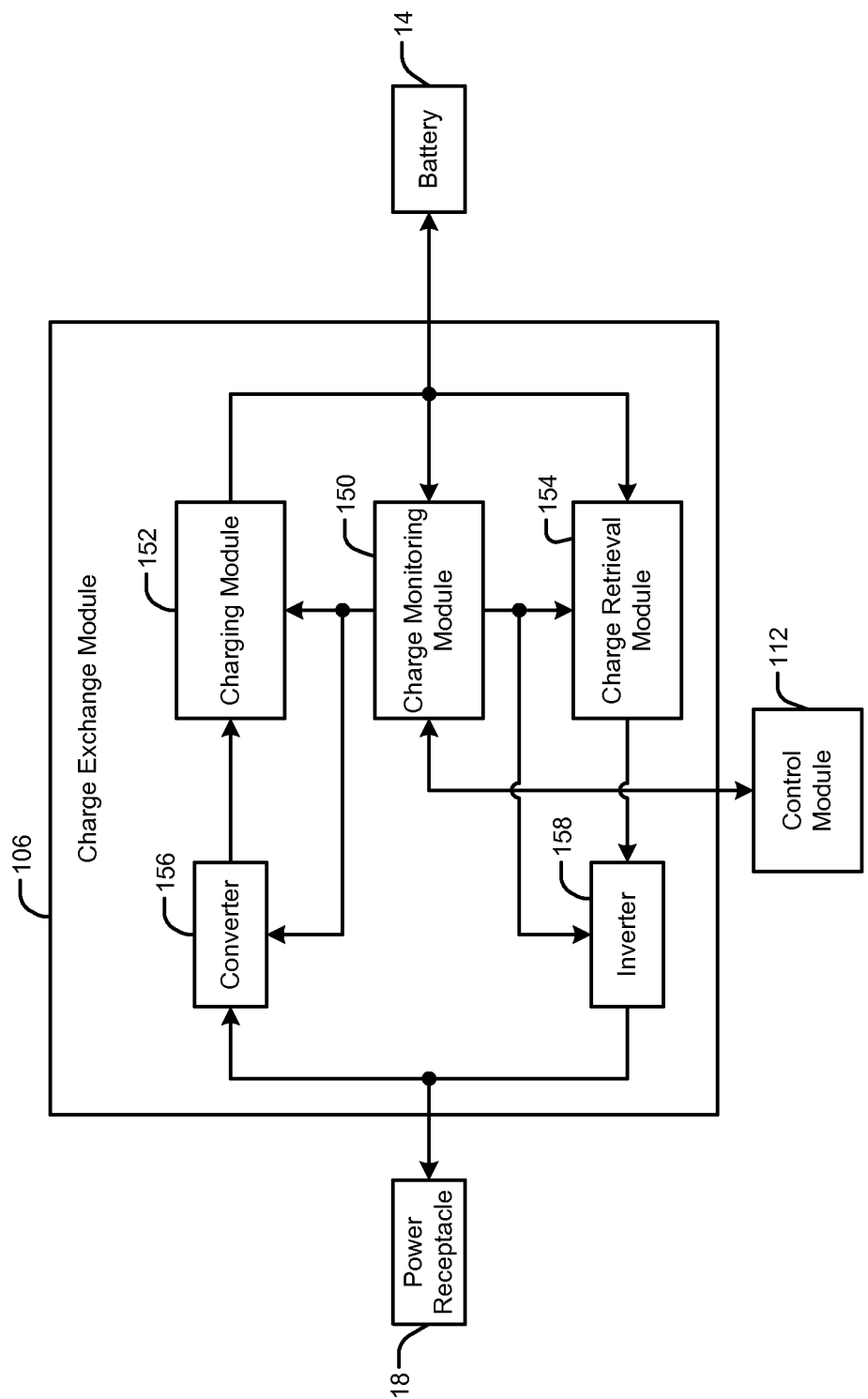
FIG. 7 is a functional block diagram of an exemplary charge exchange module used in the systems of FIGS. 3A-5B for exchanging charge between a battery in a vehicle and a utility company according to the present disclosure.

Referring now to FIG. 7, the charge exchange module 106 may comprise a charge monitoring module 150, a charging module 152, and a charge retrieval module 154. The charge monitoring module 150 may monitor the amount of charge present in the battery 14. For example, the charge monitoring module 150 may inform the control module 112 when the amount of charge in the battery 14 is less than or equal to a predetermined threshold and that the battery may need to be recharged. The charge monitoring module 150 may monitor the amount of charge in the battery 14 when the battery 14 is being charged and may inform the control module 112 when the charging is completed. Additionally, the charge monitoring module 150 may monitor the amount of charge in the battery 14 when the charge in the battery 14 is being returned to the utility company 23. The charge monitoring module 150 may inform the control module 112 when the charge in the battery 14 is less than or equal to the safe level.

The control module 112 may generate a charge control signal based on the charging parameters based on which the charging module 152 may charge the battery 14. Specifically, when the battery 14 is being charged, the charge monitoring module 150 may activate a converter 156 and the charging module 152 based on the charging parameters received from the control module 112. For example, the charge monitoring module 150 may activate the converter 156 and the charging module 152 when the time for charging the battery 14 has arrived. The converter 156 may receive input power from the power receptacle 18. The converter 156 may convert the input power to a direct current (DC) voltage. The charging module 152 may generate an output that is suitable to charge the battery 14.

The charge monitoring module 150 may inform the control module 112 when the battery 14 is charged to a predetermined level (e.g., full charge) that may be indicated in the charging parameters. Subsequently, the charge monitoring module 150 may stop charging the battery 14 by deactivating the converter 156 and the charging module 152. The power meter 24 may measure the amount of power received from the utility company 23 during the charging operation. The power meter 24 may communicate data regarding the amount of charge supplied to the battery 14 to the utility company 23.

On the other hand, when the utility company 23 takes back the charge from the battery 14, the utility company 23 may transmit a charge return request for taking the charge back from the battery 14 to the CMM 104. Upon receiving the charge return request, the control module 112 may determine if the vehicle 102 is plugged into the supply outlet 20. If the vehicle 102 is plugged into the supply outlet 20, the control module 112 may generate a charge return control signal and transmit the charge return control signal to the utility company 23 indicating that the vehicle 102 is ready to return charge.

Subsequently, based on the charge return control signal, the charge monitoring module 150 may activate the charge retrieval module 154 and an inverter 158 based on the charging parameters received from the control module 112. The charge retrieval module 154 may retrieve charge from the battery 14 and generate a DC voltage. The inverter 158 may convert the DC voltage into an AC voltage depending on the type of power supplied by the utility company 23 to the supply outlet 20. The inverter 158 may output the power to the power receptacle 18 that is connected to the supply outlet 20. Thus, the charge from the battery 14 may be returned to the utility company 23 via the supply outlet 20.

Based on the charging parameters, the charge monitoring module 150 may inform the control module 112 when the battery 14 has returned a predetermined amount of charge and/or when the charge remaining in the battery 14 is at or below the safe level indicated in the charging parameters. Subsequently, the charge monitoring module 150 may deactivate the charge retrieval module 154 and the inverter 158.

The power meter 24 may measure the amount of charge returned to the utility company 23. The power meter 24 may communicate data regarding the amount of charge retrieved from the battery 14 and returned to the utility company 23. The utility company 23 may credit the account of the user depending on the amount and the time when the user returned the charge. For example, the utility company 23 may give more credit for the charge returned when the demand for charging batteries is high than when the demand is low.

Figure 8A:
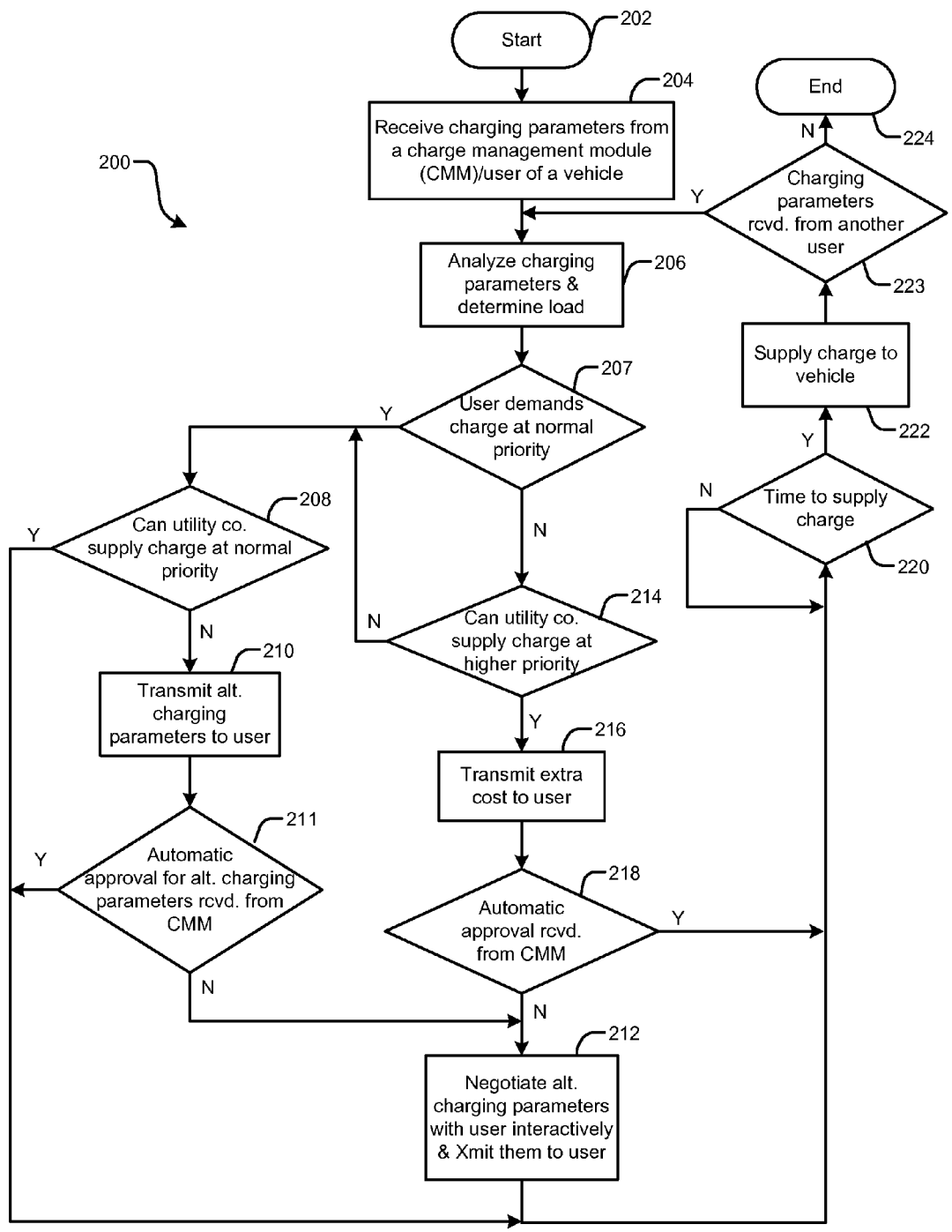
FIG. 8A is a flowchart of an exemplary method for supplying electric charge from a utility company to batteries in multiple vehicles according to the present disclosure.

Referring generally to FIGS. 8A-9B, methods for supplying power to vehicles, taking back charge from vehicles, charging batteries in vehicles, and returning charge from batteries to utility companies are shown. In FIG. 8A, a method 200 for supplying power to charge the battery 14 in the vehicle 102 may begin at step 202. In step 204, the utility company 23 may receive charging parameters from the CMM 104 and/or the user of the vehicle 102. In step 206, the LMM 134-1 may analyze the charging parameters and determine the load on the distribution system.

In step 207, the LMM 134-1 may determine whether the user demands charge at normal priority. If true, the LMM 134-1 may determine in step 208 whether the utility company 23 can supply power at normal priority. If false, the LMM 134-1 may transmit alternate charging parameters to the user in step 210. In step 211, the LMM 134-1 may determine whether the CMM 104 automatically approved the alternate charging parameters.

On the other hand, if the result of step 207 is false, the LMM 134-1 may determine in step 214 whether the utility company 23 can supply power at the higher priority. If false, the method 200 may perform steps beginning at step 208. Otherwise, the LMM 134-1 may transmit alternate charging parameters including additional cost to the user in step 216. The LMM 134-1 may determine in step 218 whether the CMM 104 automatically approved the additional cost.

If the result of step 211 or 218 is false, the user may interactively negotiate alternate charging parameters with the utility company in step 212. At the end of step 212, or if the result of step 208, 211, or 218 is true, the method may perform step 220. In step 220, the LMM 134-1 may wait until time to supply power arrives. In step 222, the LMM 134-1 may supply power to the battery 14 according to either the charging parameters received from the CMM 104 and/or the user or the alternate charging parameters. In step 223, the LMM 134-1 may determine whether charging parameters are received from other users. If true, the method 200 may perform steps beginning at step 206. If false, the method 200 may end in step 224.

Figure 8B:
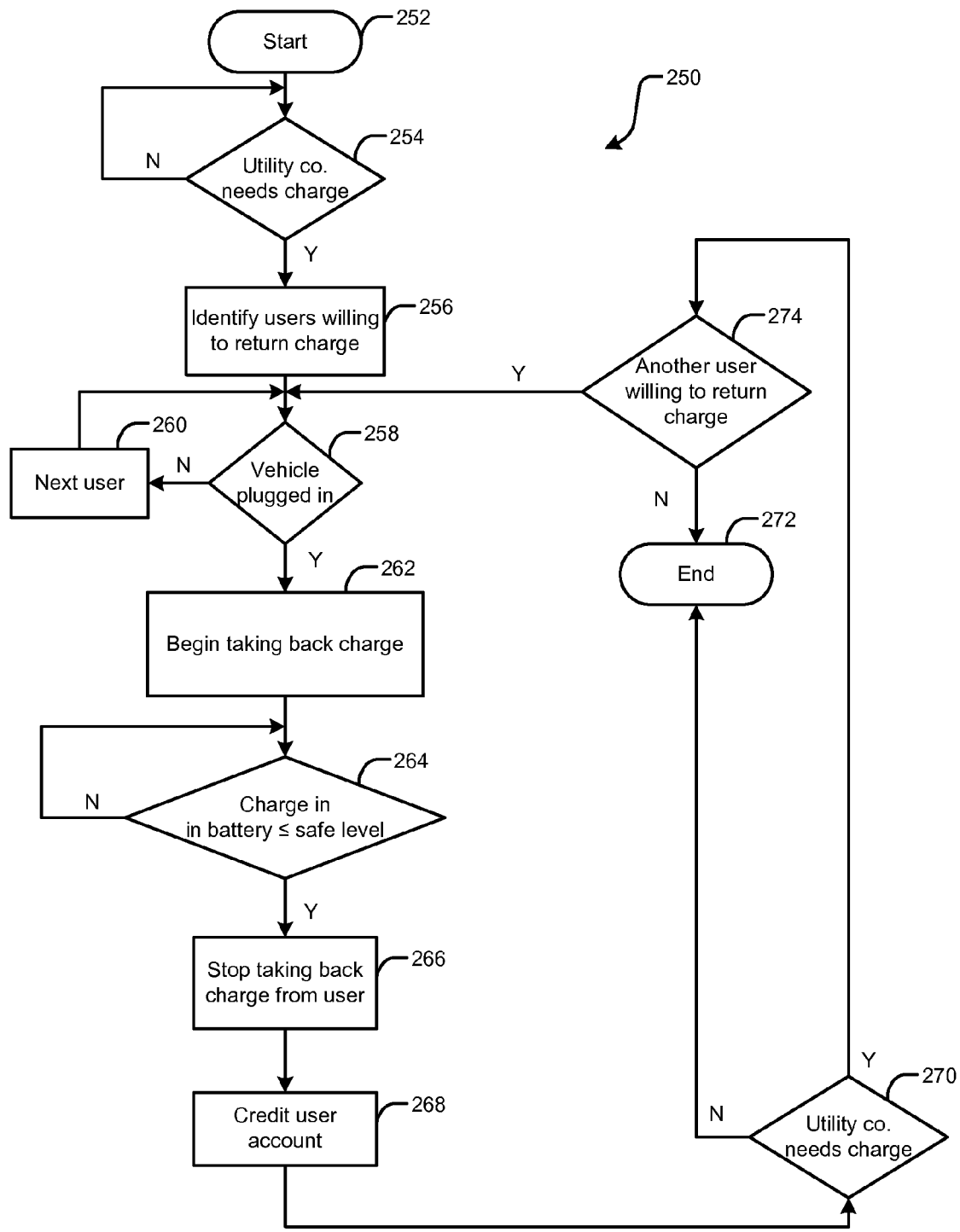
FIG. 8B is a flowchart of an exemplary method for returning electric charge from a battery in a vehicle to a utility company according to the present disclosure.

Referring now to FIG. 8B, a method 250 for taking charge back from the battery 14 in the vehicle 102 may begin at step 252. The LMM 134-1 may determine in step 254 whether the utility company 23 needs charge to fulfill demand. If false, the method 250 may wait. Otherwise, the LMM 134-1 may analyze the charging parameters stored in the database 134-2 in step 256 and identify users who may return charge. The LMM 134-1 may transmit a request to take back charge from the battery 14 in step 258 and determine based on the response received whether the vehicle 102 is plugged into the supply outlet 20. If true, the utility company 23 may begin taking the charge back in step 262.

In step 264, the utility company 23 may continue to take the charge back from the battery 14 until the charge remaining in the battery 14 is less than or equal to the safe level. When the charge remaining in the battery 14 is less than or equal to the safe level, the utility company 23 may stop taking back charge from the battery in step 266. The utility company 23 may credit the user in step 268 for the charge returned. In step 270, the LMM 134-1 may determine whether the utility company 23 still needs more charge to fulfill demand. If false, the method 250 may end in step 272. Otherwise, the LMM 134-1 may determine in step 274 whether any other user is willing to return charge. If true, the method 250 may perform steps beginning at step 258. If false, the method 250 may end in step 272.

Figure 9A:
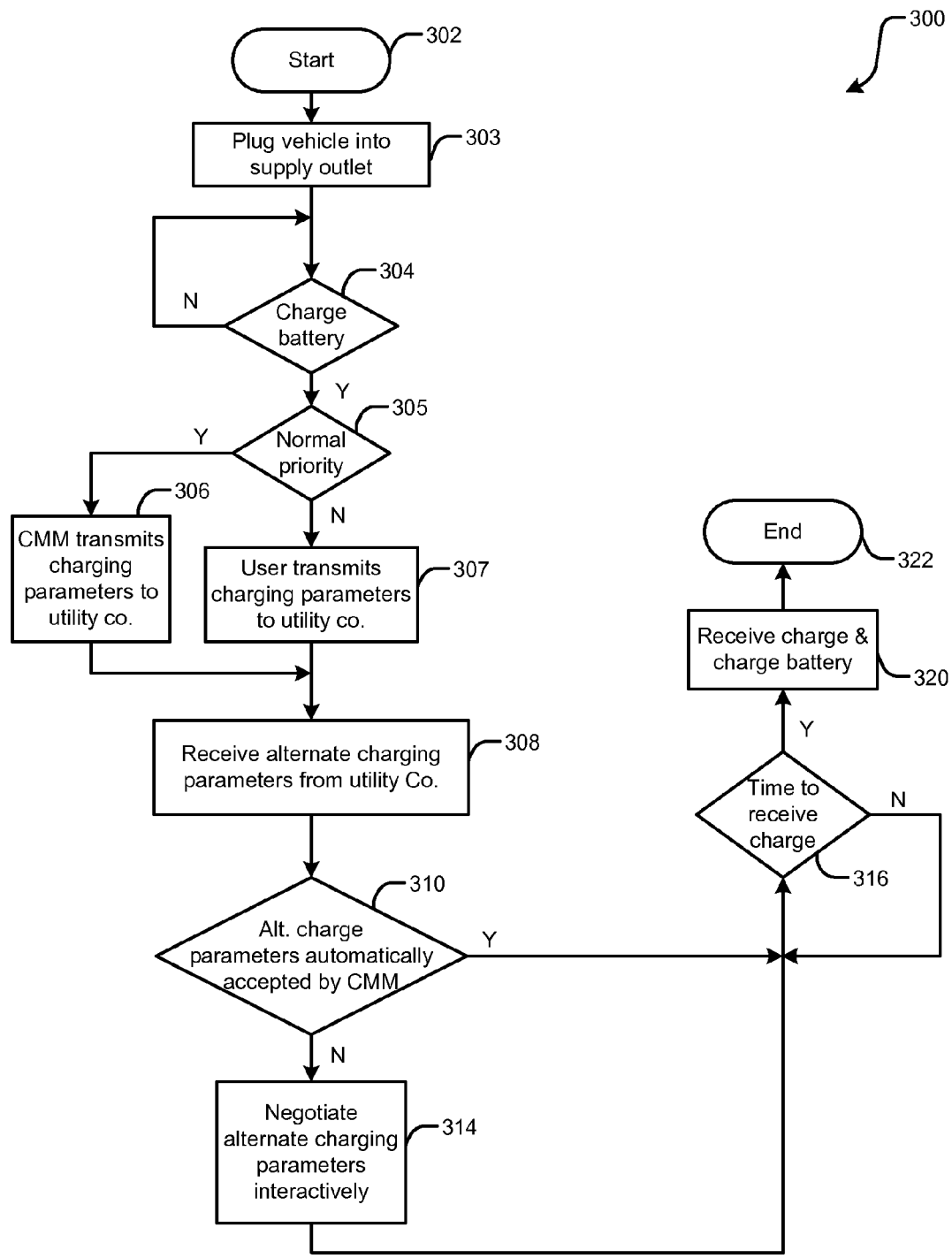
FIG. 9A is a flowchart of an exemplary method for receiving electric charge from a utility company to charge batteries in multiple vehicles according to present disclosure.

Referring now to FIG. 9A, a method 300 for charging a battery 14 in the vehicle 102 may begin at step 302. The user may plug the vehicle 102 into the supply outlet 20 in step 303. The CMM 104 may determine in step 304 whether the battery 14 needs to be charged. If false, the method 300 may wait. If true, the user may determine if the battery needs to be charged at the normal or higher priority in step 305. If normal, the CMM 104 may transmit charging parameters to the utility company 23 in step 306. Otherwise, the user may interactively transmit charging parameters to the utility company in step 307.

In step 308, the CMM 104 may receive alternate charging parameters from the utility company 23. The CMM 104 may determine whether to automatically accept the alternate charging parameters in step 310. If false, the user may interactively negotiate alternate charging parameters with the utility company 23 in step 314. At the end of step 314 or if the result of step 310 is true, the method 300 may perform step 316. In step 316, the control module 112 may determine whether the time to charge the battery 14 has arrived. If false, the method 300 may wait. Otherwise, the charge exchange module 106 may receive the charge from the supply outlet 20 and may charge the battery 14 in step 320. The method 300 may end in step 322.

Figure 9B:
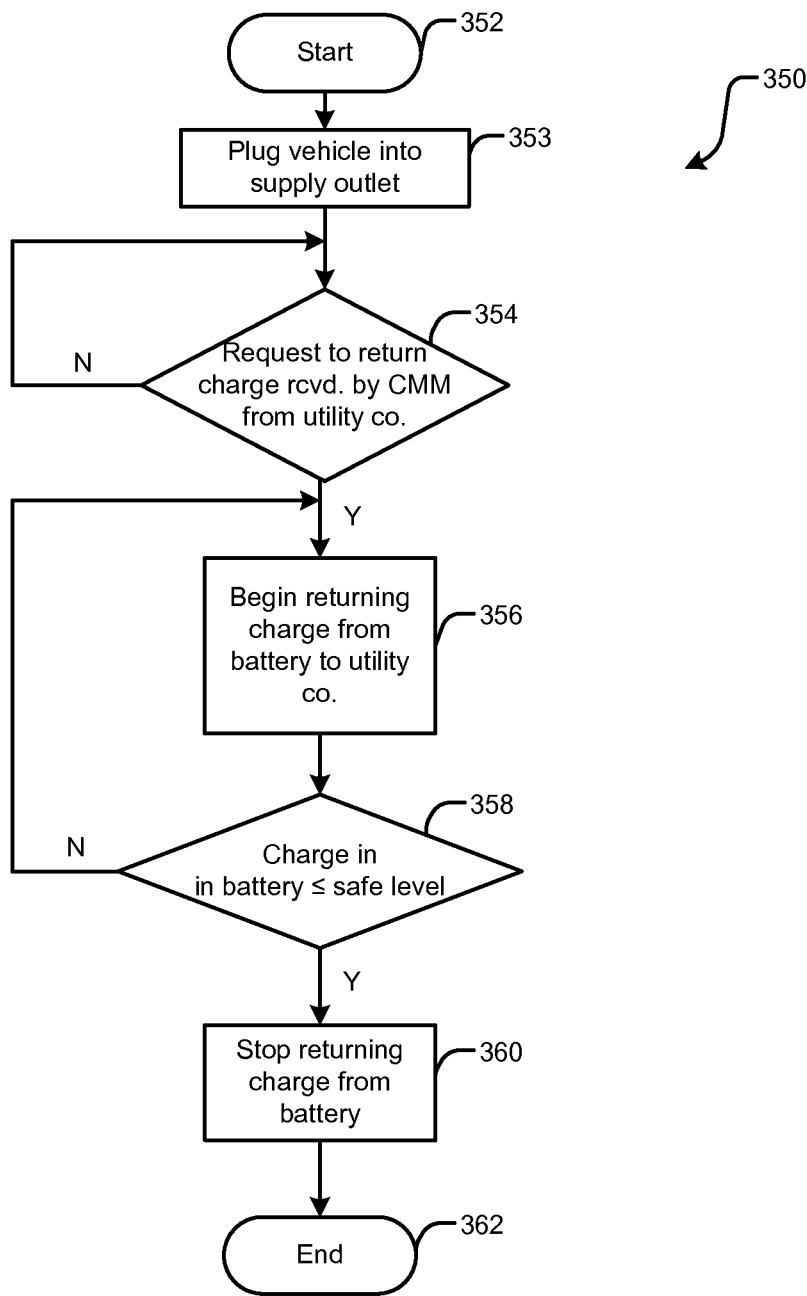
FIG. 9B is a flowchart of an exemplary method for returning electric charge from a battery in a vehicle to a utility company according to the present disclosure.

Referring now to FIG. 9B, a method 350 for returning charge from the battery 14 in the vehicle 102 to the utility company 23 may begin at step 352. The user may plug the vehicle 102 into the supply outlet 20 in step 303. The CMM 104 may determine in step 354 whether a request to return charge is received from the utility company 23. If false, the method 350 may wait. Otherwise, the control module 112 may transmit a control signal to the utility company 23 indicating that the CMM 104 is ready to return charge, and the charge exchange module 106 may begin returning charge from the battery 14 to the utility company 23 in step 356.

In step 358, the charge monitoring module 150 may determine whether the charge remaining in the battery 14 is less than or equal to the safe level. If false, the method 350 may repeat steps 356 and 358. Otherwise, the charge exchange module 106 may stop returning charge from the battery 14 to the utility company 23 in step 360. The method 350 may end in step 362.

Figure 10:
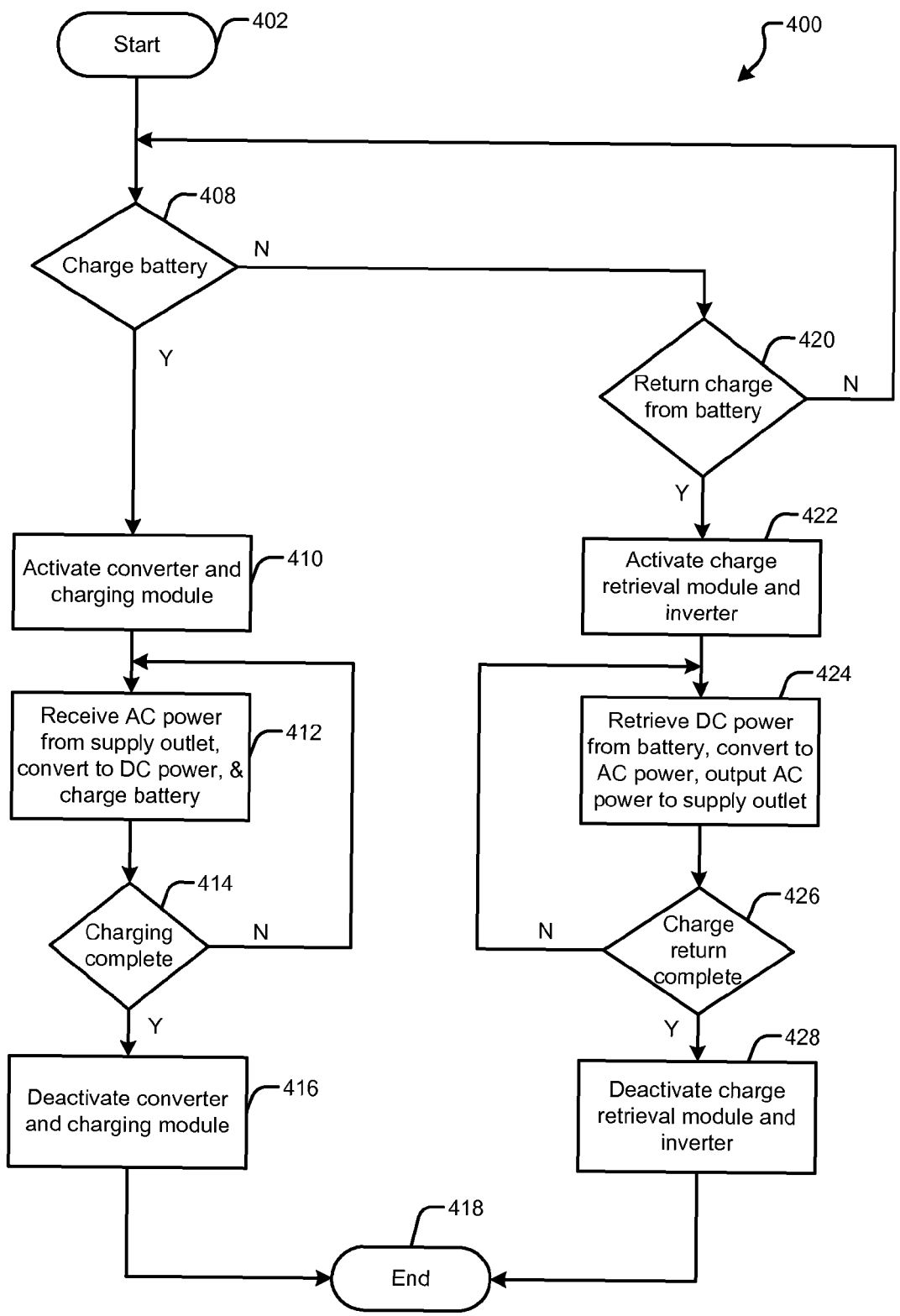
FIG. 10 is a flowchart of an exemplary method for exchanging charge between a supply outlet that supplies power to a vehicle and a battery in the vehicle according to the present invention.

Referring now to FIG. 10, a method 400 for exchanging charge between the battery 14 and the supply outlet 20 begins in step 402. Based on the charging parameters, the charge monitoring module 150 may determine if time to charge the battery 14 has arrived in step 408. If true, the charge monitoring module 150 may activate the converter 156 and the charging module 152 in step 410. The converter 156 may receive AC power from the supply outlet 20, convert the AC power to DC power, and the charging module 152 may charge the battery 14 in step 412.

Based on the charging parameters, the charge monitoring module 150 may determine in step 414 if charging of the battery 14 is complete. That is, the charge monitoring module 150 may determine in step 414 if the battery 14 received the amount of charge specified in the charging parameters. If false, the method 400 may repeat steps 412 and 414. Otherwise, the charge monitoring module 150 may inform the control module 112 that the charging is complete and may deactivate the converter 156 and the charging module 152 in step 416. The method 400 may end in step 418.

If, however, the result of step 408 is false, the charge monitoring module 150 may determine in step 420 if time to return the charge from the battery 14 has arrived. If true, the charge monitoring module 150 may activate the charge retrieval module 154 and the inverter 158 in step 422. The charge retrieval module 154 may retrieve the charge from the battery 14, the inverter 158 may convert the DC power output by the charge retrieval module 154 to AC power, and may output the AC power to the supply outlet 20 in step 424.

Based on the charging parameters, the charge monitoring module 150 may determine in step 426 if returning the charge from the battery 14 is complete. That is, the charge monitoring module 150 may determine in step 426 if the amount of charge specified in the charging parameters (e.g., charge in excess of the safe level) is returned from the battery 14. If false, the method 400 may repeat steps 424 and 426. Otherwise, the charge monitoring module 150 may inform the control module 112 that the returning of the charge is complete and may deactivate the charge retrieval module 154 and the inverter 158 in step 428. The method 400 may end in step 418.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a monitoring module configured to monitor a charge level of a battery in a vehicle;
   a network interface module configured to
      transmit a first set of charging parameters for charging the battery to a utility company, wherein the first set of charging parameters includes (i) the charge level of the battery, and (ii) a first time of the day for charging the battery; and
      receive (i) a reply, and (ii) a charge return request from the utility company for returning charge from the battery to the utility company, wherein the reply includes a second time of the day for charging the battery;
   a control module configured to generate (a) a first signal based on (i) the reply and (ii) the first set of charging parameters, and (b) a second signal based on (i) the charge return request and (ii) charge return parameters;
   a charging module configured to charge the battery based on the first signal; and
   a charge retrieval module configured to return charge from the battery to the utility company based on the second signal.

2. The system of claim 1, wherein the charge retrieval module is configured to return the charge from the battery to the utility company until a predetermined amount of charge is retrieved from the battery.

3. The system of claim 1, wherein the charge retrieval module is configured to return the charge to the utility company in response to the charge return request being consistent with the charge return parameters.

4. The system of claim 1, wherein the control module is configured to decline the charge return request in response to the charge return request being inconsistent with the charge return parameters.

5. The system of claim 1, wherein the control module is configured to negotiate alternate charge return parameters in response to the charge return request being inconsistent with the charge return parameters.

6. The system of claim 1, wherein the charge return request includes a time to begin charge return.

7. The system of claim 1, further comprising a user interface configured to allow a user to enter the charge return parameters.

8. The system of claim 1, wherein the control module is configured to evaluate the charge return request based on the charge level of the battery.

9. The system of claim 1, wherein the charge retrieval module is configured to return the charge from the battery in response to the charge level of the battery being greater than or equal to a predetermined minimum charge level.

10. The system of claim 1, wherein the network interface module includes one of a wireline interface, a wireless interface, and a powerline carrier (PLC) interface.

11. The system of claim 1, further comprising an inverter configured to invert the charge retrieved from the battery prior to returning the charge to the utility company.

12. The system of claim 1, further comprising a converter configured to convert power received from the utility company from alternating current (AC) power to direct current (DC) power.

13. A method comprising:
   monitoring a charge level of a battery in a vehicle;
   transmitting a first set of charging parameters for charging the battery to a utility company, wherein the first set of charging parameters includes (i) the charge level of the battery, and (ii) a first time of the day for charging the battery;
   receiving (i) a reply, and (ii) a charge return request from the utility company for returning charge from the battery to the utility company, wherein the reply includes a second time of the day for charging the battery;
   generating a first signal based on (i) the reply, and (ii) the first set of charging parameters;
   generating a second signal based on (i) the charge return request, and (ii) charge return parameters;
   charging the battery based on the first signal; and
   returning charge from the battery to the utility company based on the second signal.

14. The method of claim 13, further comprising returning the charge from the battery to the utility company until a predetermined amount of charge is retrieved from the battery.

15. The method of claim 13, further comprising returning the charge to the utility company in response to the charge return request being consistent with the charge return parameters.

16. The method of claim 13, further comprising declining the charge return request in response to the charge return request being inconsistent with the charge return parameters.

17. The method of claim 13, further comprising negotiating alternate charge return parameters in response to the charge return request being inconsistent with the charge return parameters.

18. The method of claim 13, wherein the charge return request includes a time to begin charge return.

19. The method of claim 13, further comprising evaluating the charge return request based on the charge level of the battery.

20. The method of claim 13, further comprising returning the charge from the battery in response to the charge level of the battery being greater than or equal to a predetermined minimum charge level.

21. The method of claim 13, further comprising inverting the charge retrieved from the battery prior to returning the charge to the utility company.

22. The method of claim 13, further comprising converting power received from the utility company from alternating current (AC) power to direct current (DC) power.

* * * * *